(12) United States Patent
Negoro

(10) Patent No.: US 10,235,522 B2
(45) Date of Patent: Mar. 19, 2019

(54) DEFINITION STRUCTURE OF PROGRAM FOR AUTONOMOUSLY DISABLING INVADING VIRUS, PROGRAM EQUIPPED WITH STRUCTURE, STORAGE MEDIUM INSTALLED WITH PROGRAM, AND METHOD/DEVICE FOR AUTONOMOUSLY SOLVING VIRUS PROBLEM

(71) Applicant: Fumio Negoro, Kanagawa (JP)

(72) Inventor: Fumio Negoro, Kanagawa (JP)

( * ) Notice: Subject to any disclaimer, the term of this patent is extended or adjusted under 35 U.S.C. 154(b) by 213 days.

(21) Appl. No.: 15/423,481

(22) Filed: Feb. 2, 2017

(65) Prior Publication Data

US 2017/0213029 A1 Jul. 27, 2017

Related U.S. Application Data

(63) Continuation-in-part of application No. PCT/JP2015/056268, filed on Mar. 3, 2015.

(30) Foreign Application Priority Data

Aug. 4, 2014 (JP) .................................. 2014-158612

(51) Int. Cl.
*G06F 17/00* (2006.01)
*G06F 21/56* (2013.01)
*H04L 29/06* (2006.01)

(52) U.S. Cl.
CPC ............ *G06F 21/561* (2013.01); *G06F 21/56* (2013.01); *G06F 21/566* (2013.01); *G06F 21/568* (2013.01); *G06F 2221/034* (2013.01)

(58) Field of Classification Search
None
See application file for complete search history.

(56) References Cited

U.S. PATENT DOCUMENTS

| 8,099,785 B1 * | 1/2012 | Pavlyushchik | ......... G06F 21/56 726/22 |
| 2004/0054637 A1 * | 3/2004 | Negoro | ..................... G06F 8/10 706/45 |

(Continued)

FOREIGN PATENT DOCUMENTS

| JP | 2003-108253 A | 4/2003 |
| JP | 2012-234579 A | 11/2012 |

(Continued)

*Primary Examiner* — Gary S Gracia
(74) *Attorney, Agent, or Firm* — Manatt, Phelps & Phillips, LLP

(57) ABSTRACT

Even if a virus invades a program in operation according to the present invention, regardless of the timing and means of invasion and the number of attempts thereof, the present program autonomously and unassistedly detects the virus as contamination of a memory area used by the program and disinfects the contamination for quick recovery in order to continue the normal operation. The present program detects the virus as contamination caused by false information against the intent of the present program. Upon occurrence of contamination, the present program detects the contamination as a predicate inconsistency. However, this scheme is not for detecting an invading virus but is needed as a structural requirement in order for the program to exist as a legitimate program. The present program disinfects the detected contamination using a scheme in accordance with the present invention. The timing of disinfection prevents the symptoms of the invading virus from appearing, in view of which this exerts the same operational effect as that of destroying the viral intention. Consequently, the virus invading the present program is disabled by the present program before appearance of the intended symptoms of the virus.

34 Claims, 20 Drawing Sheets

(56) References Cited

U.S. PATENT DOCUMENTS

| | | | |
|---|---|---|---|
| 2005/0120238 A1* | 6/2005 | Choi | G06F 21/566 |
| | | | 726/26 |
| 2006/0265749 A1* | 11/2006 | Kwon | G06F 21/562 |
| | | | 726/24 |
| 2012/0060217 A1* | 3/2012 | Sallam | G06F 21/566 |
| | | | 726/23 |
| 2012/0240185 A1* | 9/2012 | Kapoor | H04L 63/1425 |
| | | | 726/1 |

FOREIGN PATENT DOCUMENTS

| | | |
|---|---|---|
| JP | 2013-164732 A | 8/2013 |
| JP | 2013-243864 A | 12/2013 |
| WO | 2005/029322 A1 | 3/2005 |

* cited by examiner

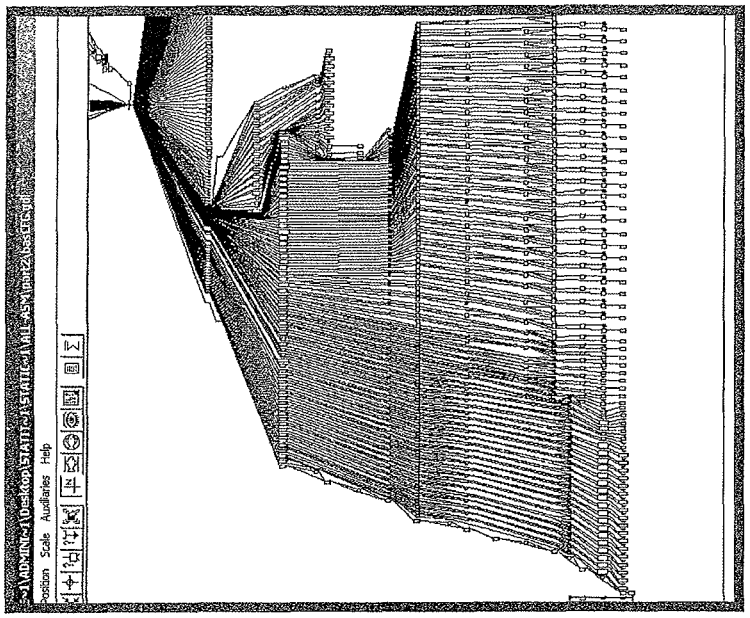
(DATA CONNECTION-TYPE PROGRAM)
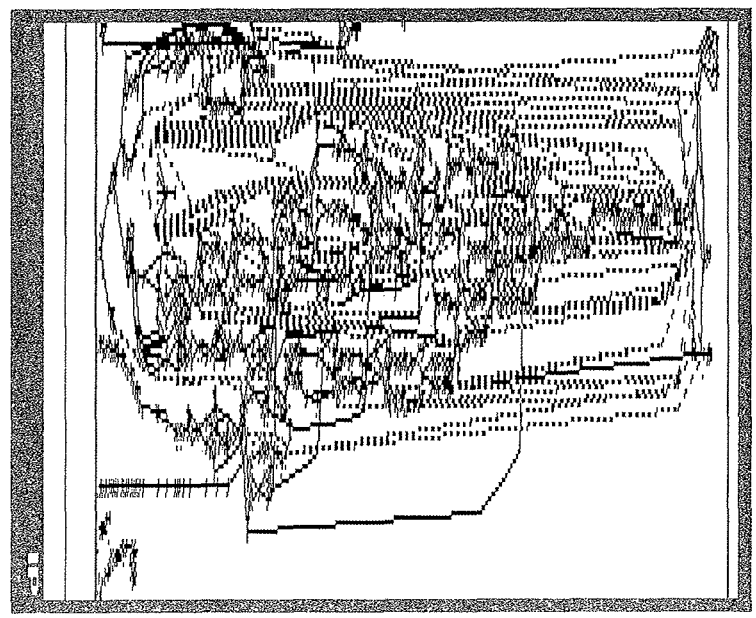
(LOGIC CONNECTION-TYPE PROGRAM)
*Programs analysis by SamCOTS (Static Analyzer of Malicious COTS), Laval University*
FIG. 1E

| No | VECTOR TYPE | INSTALLED PALLET TYPE | RULED INSTRUCTIVE STATEMENT EXAMPLE | POSITION OF INSTRUCTIVE STATEMENT |
|---|---|---|---|---|
| 1 | L4, NOUN | P4 | SUBSTITUTION STATEMENT | SECOND RULE |
| 2 | L2, NOUN | P2 | CONSTANT VALUE STATEMENT | SECOND RULE |
| 3 | L3, NOUN | P3 | CONDITIONAL STATEMENT | THIRD RULE |
| 4 | W4, NOUN | P4 | OUTPUT STATEMENT | FOURTH RULE |
| 5 | R2, NOUN | P2 | INPUT STATEMENT | SECOND RULE |
| 6 | E41, P4 | P4 | NONE | — |
| 7 | E42, P4 | P4 | NONE | — |
| 8 | T4, P4 | P4 | NONE | — |
| 9 | T2, P2 | P2 | NONE | — |
| 10 | T31, P3 | P3 | NONE | — |
| 11 | T32, P3 | P3 | NONE | — |
| 12 | T33, P3 | P3 | NONE | — |

FIG. 2

| FOURTH REGION | SECOND FLAG | SIXTH FLAG | SEVENTH FLAG | REMARKS |
|---|---|---|---|---|
| ON | ON | OFF | OFF | VECTOR ESTABLISHES LEGITIMATE SUBJECT |
| OFF | OFF | ON | OFF | VECTOR REQUESTS RESTART |
| OFF | OFF | OFF | ON | VECTOR REQUESTS STOPPING RESTART |

FIG. 4B

| VALUE OF THE NUMBER OR ESTABLISHED SUBJECTS | STACK ORDER |
|---|---|
| THE OLDEST NUMBER OF ESTABLISHED SUBJECTS | NS5 |
| THE NUMBER OF ESTABLISHED SUBJECTS | NS4 |
| THE NUMBER OF ESTABLISHED SUBJECTS | NS3 |
| THE NUMBER OF ESTABLISHED SUBJECTS | NS2 |
| THE LATEST NUMBER OF ESTABLISHED SUBJECTS | NS1 |

FIG. 6

| PROGRAM | STATEMENT TYPE | VECTOR TYPE | SUBJECT | COOPERATIVE STATEMENT | LINE NO. | TCX | TCY | TCZ1 | TCZ2 | TCZ3 | TCZ4 |
|---|---|---|---|---|---|---|---|---|---|---|---|
| G=10 | STATIONARY ARRANGEMENT | L2 | G | | 86 | 86 | 87 | | | | |
| L1 READ F1(R, F) | INPUT | R2 | F1(R, F) | | 87 | 87 | 88 | | | | |
| F=R−F | SUBSTITUTION | L4 | F | | 88 | 88 | 89 | | | | |
| IF F<0 | CONDITIONAL | L3 | | ● | 89 | 89 | | 90 | 91 | 91 | 92 |
| GO TO L1 | CONTROL | | | ● | 90 | 90 | | 87 | | | |
| END−IF | TRANSLATION | | | ● | 91 | 91 | 92 | | | | |
| CLOSE F1 | TRANSLATION | L4 | F1 | ● | 92 | 92 | 93 | | | | |
| E=B−F | SUBSTITUTION | L4 | E | | 93 | 93 | 94 | | | | |
| IF E=F | CONDITIONAL | L3 | | ● | 94 | 94 | | 95 | 96 | 97 | 98 |
| A=D+R+5 | SUBSTITUTION | L4 | A | | 95 | 95 | 97 | | | | |
| A=2*R+5 | SUBSTITUTION | L4 | A | | 96 | 96 | 97 | | | | |
| END−IF | TRANSLATION | | | ● | 97 | 97 | 98 | | | | |
| C=G−A | SUBSTITUTION | L4 | C | | 98 | 98 | 99 | | | | |
| B=G−F | SUBSTITUTION | L4 | B | | 99 | 99 | 100 | | | | |
| IF(B+C)<0 | CONDITIONAL | L3 | | ● | 100 | 100 | | 101 | 102 | 102 | ? |
| D=B+C | SUBSTITUTION | L4 | D | | 101 | 101 | 102 | | | | |
| END−IF | TRANSLATION | | | ● | 102 | 102 | ? | | | | |

FIG. 11A

| TCZ4 | UNIT STATEMENT IN METALINGUISTIC REPRESENTATION | METALINGUISTIC COORDINATES ||||| 
| | | SUBJECT | VARIABLE SUBJECT | INDICATOR | CONSTANT VALUE | STATIONARY ARR |
|---|---|---|---|---|---|---|
| | G[86,11]=10[86] | G[86,11] | | | 10[86] | |
| | L1[87,90]READ F1(R[87,12-1],F[87,12-2]) | F1(R[87,12-1],F[87,12-2]) | R[87,12-1], F[87,12-2] | L1[87,90] | | |
| | F[88,12]=R[87,12-1]−F[87,12-2] | F[88,12] | R[87,12-1], F[87,12-2] | | | |
| 92 | 89.IF F[88,12]<0[89] | | F[88,12] | | 0[89] | |
| | 90.GO TO L1[90,87] | | | L1[90,87] | | |
| | 91.END−IF | | | | | |
| | 92.CLOSE F1[87] | F1[87] | | | | |
| | E[93,13]=B[99,17]−F[88,12] | E[93,13] | B[99,17], F[88,12] | | | |
| 98 | 94.IF E[93,13]=F[88,12] | | E[93,13], F[88,12] | | | |
| | A[95,20]=D[101,15]+R[87,12-1]+5[95] | A[95,20] | D[101,15], R[87,12-1] | | 5[95] | |
| | A[95,20]=2[96]∗R[87,12-1]+5[96] | A[96,20] | R[87,12-1] | | 2[96], 5[96] | |
| | 97.END−IF | | | | | |
| | C[98,16]=G[86,11]−A[ ,20] | C[98,16] | G[86,11], A[ ,20] | | | |
| | B[99,17]=G[86,11]−F[88,12] | B[99,17] | G[86,11], F[88,12] | | | |
| ? | 100.IF(B[99,17]+C[98,16])<0[100] | | B[99,17], C[98,16] | | 0[100] | |
| | D[101,15]=B[99,17]+C[98,16] | D[101,15] | B[99,17], C[98,16] | | | |
| | [102.]END−IF | | | | | |

FIG. 11B

| SUBJECT NO. | SUBJECT | VARIABLE SUBJECT | PROGRAM TO WHICH SUBJECT OF VARIABLE SUBJECT BELONGS |
|---|---|---|---|
| 1 | A(1, 1) | B(1, 1) | (1, 1) |
|   |   | C(1, 1) | (1, 1) |
| 2 |   |   |   |

FIG. 13

DEFINITION STRUCTURE OF PROGRAM FOR AUTONOMOUSLY DISABLING INVADING VIRUS, PROGRAM EQUIPPED WITH STRUCTURE, STORAGE MEDIUM INSTALLED WITH PROGRAM, AND METHOD/DEVICE FOR AUTONOMOUSLY SOLVING VIRUS PROBLEM

TECHNICAL FIELD

The present invention relates to a program structure theory and, in particular, to a definition structure of a program for autonomously solving the problems of computer viruses (hereinafter, also simply called "viruses"), a program equipped with the same structure, a storage medium installed with the same program, and a method and device for autonomously solving the virus problems.

BACKGROUND ART

In consideration of intrinsic dangers of conventional programs, program problems not only include computer virus problems but also have caused situations which cannot be justified based on the low quality, burdensomeness of management of development, and surging cost, only in view of improvement in usefulness.

It is a known fact that although programs have advantageous effects of convenience, the programs face a situation called the software crisis.

In such a current situation, the actual state of maintenance of program development is a diabolical state where even the will for improvement is precluded. Furthermore, occurrence of computer viruses (hereinafter also simply called "viruses") has a potential of irresistibly collapsing the computer society, and this field is in a situation where the foundation is shaken in that no one is able to solve this problem. The conventional way where the convenience of advantageous effects is mentioned without sincerely solving the problems of the software crisis cannot be taken any more.

Without sincerely solving the problems of the software crisis, only in one view of convenience, forcible standardization (Procrustean bed) by a strong institutional system has dominated engineers, researchers, and users, that is, almost all parties in this field in the scale of human beings.

Resultantly, as with the fact that people who do not notice the importance of solving program problems make the program problems diabolical, the current policy for virus problems is the same as this fact, and the idea is entirely restricted to blocking of virus invasion at the entry (virus buster). The danger of virus problems is that any virus creator having the capability can participate in virus creation in secrecy and with not being located at all. That is, the seriousness is that the problems are transformed into quantitative problems.

As to the virus problems, it can be conventionally considered that invasion into a program cannot be blocked unless the program exists. The human beings cannot overcome the virus problems without changing the consideration and finding a method of allowing the virus-invaded program itself to disable the virus.

Against such a problem, currently existing products addressing viruses (hereinafter, simply called "products") are based on a concept of blocking invasion of viruses into programs beforehand. That is, the foundation on which the products depend cannot be established without analyzing secretly obtained virus tags and illegal information analysis invasion fragments. Complete blocking of virus invasion cannot be achieved. That is, intrinsically, the current policy for products cannot serve as intrinsic method of solving virus problems.

The present application is to discuss seriously intrinsic measures against virus invasion problems having advanced in a wrong direction as described above. In this view, there is no technologies to be effectively cited. Consequently, the following list includes literature having common items in view of taking measures against virus problems.

CITATION LIST

Patent Literature

Patent Literature 1: Japanese Patent Laid-Open No. 2013-243864
Patent Literature 2: Japanese Patent Laid-Open No. 2012-234579

SUMMARY OF INVENTION

Technical Problem

In view of only one possible advanced virus being capable of collapsing a computer system, a perception that even one virus should not be allowed to invade a program should be the right recognition. In other words, this point has been an absolute requirement for solving virus problems.

Consequently, the solution to virus problems cannot be achieved by an idea such as a virus buster. That is, without finding of the principle of a solving method therefor, the virus problems cannot be solved.

The present invention is to solve the problems of such a conventional art, and has an object to provide a fundamental solving method against the computer virus problems, that is, to provide a definition structure of a program that autonomously solves the virus problems, and a program equipped with this structure, a storage medium installed with this structure, and a method of autonomously solving the virus problems.

Solution to Problem

To achieve such an object, the present invention provides a method of solving (i.e., intrinsically resolving) the virus problem through a new approach having not existed. To specifically describe the present invention, the description is made according to the following sequence.
A. Background of reaching method of solving problems
B. Perception of virus problems
C. Construction of methodology intrinsic to present application (A. Background of Reaching Method of Resolving Problems)

The first instance of the research reaching the present invention was started by the present inventor in 1973 based on a hypothesis that improvement in description method can solve the software crisis. In fifteen years on the former stage of this research, the world knowledge (theses) was collected and several hundred programs in various fields was dynamically analyzed in order to consider the nature of programs. The program dynamic analysis is indispensable for finding a good static definition (source code) of a program. For the sake of a good static definition of the dynamics, it is important to know the dynamics well, which is not only applied to the programs.

However, in this field, the program dynamic analysis has not been sufficiently performed since that time. Incidentally, FIG. 12 shows an aspect of the dynamics of a program ascertained by this research. This diagram is the first in the world. Without viewing the spectacle of FIG. 12 on the dynamics of the program, it is considered that modes of designing program languages, OSs and application programs cannot be discussed. The fifteen years during which the program dynamic analysis was performed is a period allowing our description method on programs to be sincerely discussed, for the present inventor.

We, the human beings, can be conscious of what we think, by ourselves. In a case in a living state immediately before conversion of the consciousness into characters or language, the state of possible inspirational consciousness cannot be correctly identified. In the research reaching to the present invention, this living state is considered to have a scheme of determining description. On the basis thereof, a metaphysical model has been discussed and hypothesized. This metaphysical model is denoted as "harmonic structure". This is then described as "Conscious Function". The origin of an algorithm for deriving FIG. 12 is what is obtained as a solution of the Conscious Function. The Conscious Function is analyzed again as a program using the knowledge of a program. This program is then called a Scenario Function.

The Scenario Function is according to an unprecedented program description method. The Scenario Function is established as "a scheme of making a noun be a subject and tracing genealogy for the subject". In addition, without limitation to the program, the model of any behavior we conduct can be concluded as the Conscious Function.

The minimal unit of the harmonic structure is associated with an existence of ontology. Existences are defined by entities and attributes. According to the Scenario Function, an existent identifier is interpreted as a minimal class noun, an existent entity is interpreted as the content of the noun, the content of the noun is interpreted as a subject, and the attribute is interpreted as a set of nouns to be subjectified. On the stage of the Conscious Function, definition description can be perceived to have duplicability. Incidentally, the duplicability of a program is "provided that the names of nouns belonging to a program language and program specifications, the number of names, and memory to be subjectified are the same, the source codes of the program even by any creator coincide with each other as if the source codes had been copied by a copier".

The (prototype) of the Scenario Function was obtained in 1996, 23 years after start of this research. The above facts are disclosed by theses on this research. The basic part of the concept of the Scenario Function has been patented since 1999 in Japan, the U.S. and Europe. The Scenario Function has been used in 36 development projects. The characteristics of the Scenario Function have been analyzed thereafter. In 2009, it was verified that the following issues unresolvable by conventional programs are established as methodology according to the Scenario Function.
(1) Establishment of duplicability
(2) Finding (scheme of meaning) of automatic algorithm of capturing scheme of meaning
(3) Scheme of automatically generating program
(4) Scheme of automatically supporting program maintenance operation
(5) Extinction of concept of quality The way of creating programs in this quarter-century during which programs have been ascertained only in view of programming languages is a proof of abandonment of the method of solving the program problems. In consideration that programs are descried matter, a creation method (methodology) is indispensable to create the programs. The program description method is established based on a program having the duplicability.

(B. Perception of Virus Problems)

Here, the virus problems are further discussed. The method of solving virus problems includes the following concepts.
(1) Block the virus before invasion into a program
(2) In addition to the above (1), the public authority is added to criminalize and eliminate the virus problems.
(3) Invaded program (invaded medium) is caused to solve the virus problems In principle, the methods of virus invasion are as many as the number of instructions of programs in operation. While it cannot be known how many instructions are operating in the world, an ungraspable number of instructions are currently in operating states.

The ideas (1) and (2) of blocking virus invasion cannot be regarded as proper ideas. In a manner analogous to that the virus problems cannot reach the solution to the program problems of the software crisis, these ideas only partially resolve the virus problems and are nothing but spurring chaos. The virus problems are intrinsically simple technological problems due to a defect of program creating method (this point is described later); intrinsically, the problems cannot be solved by a simple idea saying that you should not create a virus and if you make it, the public authority punish you cannot resolve the problem without claiming the original responsibility. In other words, it can be said that blocking of virus invasion cannot solve the virus problems (cannot provide a fundamental resolution). As described above, a single set of virus can collapse computer systems. Technologies incapable of complete invasion blocking are meaningless without exclusion in an analogous manner. Consequently, the resolving methods (1) and (2) cannot solve the virus problems.

Accordingly, a solution to the virus problems is meaningless unless the solution is the final solution of completely disabling viruses. Consequently, only (3) is the remaining method of obtaining the solution. The logical conclusion is that the final solution should be obtained by this method.

(C. Construction of Methodology Intrinsic to Present Application)

The present invention has an aim of disabling viruses. The present invention often uses a word, solution, which is a word adopted to be discriminated in vocabulary from a word, resolution. That is, the present invention uses "solution" as fundamental elimination of the problems, while using "resolution" as clinical sealing of problems which cannot be intrinsically sealed.

Incidentally, the virus problem is a word having a general meaning of adverse effects of a virus occurring in a computer system. The virus is an executable program. The virus invades to dwell in a program in operation according to any method. After the virus dwells, the program is contaminated. Program contamination is a viral phenomenon irrelevant to a viral intent. Virus contamination affects other programs that share a memory area and are operating in synchronization. Meanwhile, a viral symptom is a viral phenomenon intentionally caused by a virus.

The invaded medium cannot ascertain the entity of virus. It is intrinsic that even with awareness of the viral symptom, it is too late to take any measure. In other words, awareness of the viral symptom does not help the solution, and the viral symptom appears after contamination. That is, the contamination and the symptom occur at different timing.

The virus problem is a word having the meaning of adverse effects of contamination due to a virus occurring in a computer system. The solution to the virus problems is not elimination of the virus, or blocking of invasion. The solution is unassisted elimination of contamination. What is herein called the computer system is a program. The viral intent is determination by a virus creator.

The virus is created based on the viral intent. The viral intent is described later. The virus is an executable program. The virus invades to dwell in a program in operation according to any method. After the virus dwells, the program is contaminated. The present invention calls the program contaminated with the virus an invaded medium. Program contamination is a viral phenomenon irrelevant to a viral intent.

Program contamination affects other programs that share a memory area and are operating in synchronization. Meanwhile, a viral symptom is a viral phenomenon intentionally caused by a virus. It should be considered that even if the entity of virus is ascertained or the way and symptom of virus are known in detail, measures for solving the virus problems cannot be obtained therefrom. The viral symptom appears after contamination. That is, the contamination and the symptom occur at different timing.

The reasons of occurrence of program contamination are described as follows.
(1) contamination caused by virus invasion as a signal
(2) contamination caused in a process of establishing a viral symptom
(3) contamination caused as a viral symptom The program contamination results in overwriting of instructive statements of a program. The way of overwriting instructive statements is described later. A viral symptom is a viral phenomenon intentionally caused by a virus on the basis of an invaded medium. That is, the viral symptom is a phenomenon of a viral intent. Examples of the viral symptom are described later. The invaded medium is a viral possession medium indispensable to a virus. All the programs in operation are candidates of possession media. The virus has a structure that is not established by itself but is established based only on the invaded medium. In view of solving the virus problems, viral contamination of the invaded medium can be regarded as an inevitable viral weak point. The present invention detects viral contamination as a predicate inconsistency occurring in the present program, at timing before occurrence of the symptom. The contamination is then disinfected, which solves the virus problems.

The cause of the predicate inconsistency occurring in the present program is viral contamination. The predicate inconsistency is detected as situations occurring on the structure of the present program. Thus, the predicate inconsistency detected by the present program is caused by viral contamination but is not based on viral information. In summary, the present program allows the virus to invade the present program freely, and solve the virus problems. That is, even with any intent of the virus and even with any ingenious way by which the virus has been devised, the contamination of the present program serving as an invaded medium inevitably caused by the virus is disabled at timing before occurrence of the viral symptom, thereby solving the symptomatic problems. Thus, even with presence of the virus, the intent cannot be achieved. The meaning of "disabling the virus" is therefor. Consequently, even with viral invasion, the intention of the original operation of the program is not impeded.

FIG. 1D is a diagram showing an established main concept in a research process of the present invention. As shown in the diagram, the present invention ascertains how the virus-invaded program recognizes the virus, as program contamination. It is then considered that the virus problems cannot be extinguished without detection by the contaminated program itself. This was the turning point for solving the virus problem. This was in 2000. Reference sign 1D-1 denotes this situation. In order to achieve the concept of solution, it is required to grasp the characteristics of the Scenario Function further and deeper. In an aspect of obtaining the completeness of an algorithm of obtaining the solution of the Scenario Function, the scheme of solution was ascertained in 2009. Reference sign 1D-2 denotes this situation. Next, the principle of solution was ascertained in 2011. Reference sign 1D-3 denotes this situation. The structure of a program of achieving solution was obtained in 2013. Reference sign 1D-4 denotes this situation.

(Viral Intent and Viral Symptom)

The viral intent and symptom (example) are described below. The viral intent is estimated to be developed from this time forward. Consequently, description is made according to separate levels.

Level 1: Utilization of existing system (rewriting of input and output data, and DB information piracy)
Level 2: Insurgency of system (fluctuation in input and output information)
Level 3: Achievement of silence of system (discard of input and output information)
Level 4: Destruction of system (destruction of conditional statement)
Level 5: System occupation (control of activation timing of virus).

(Description of Contamination of Instructive Statements)

The viral contamination results in contamination of instructive statements of a program. The contamination of instructive statements results in a phenomenon of overwriting the instructive statements. The structure of the instructive statement forms the contents of contamination. That is, the contents are as follows.
(1) Data area used by instructive statements
(2) Instruction code of instructive statements
(3) Constant (constant value) directly used by instructive statement
(4) Character string (stationary arrangement) directly used by instructive statement The contamination of a data area affects other programs operating in synchronization using the same data area. It cannot be recognized which instructive statement in an invaded medium is contaminated, how many instructive statements are contaminated, and which part of an instructive statement is contaminated, without observation at the timing of invasion. The present invention has a scheme where upon execution of an instructive statement belonging to a program, the contamination of a data area used by the instructive statement is observed by a scheme of ruling the instructive statement. This scheme is called a vector.

The present program detects the contamination of an instruction code according to an OS and Vector E42. The OS detects the contamination of an instruction code as destruction of an instruction. E42 detects the destruction of an instruction as the contamination of instruction code, and as logical inconsistency occurring in the present program. The logical inconsistency is detected using the stack of the number of established subjects. The details are described later. The contamination of a stationary arrangement, a constant value and the name of an area can be regarded as destruction of instruction code. If an OS and a programming language are improved, the stationary arrangement problems can be solved as destruction of an instruction that allows automatic recovery, at timing and simplicity more excellent than those of E42. The scheme of E42 cannot be replaced with the mechanism of a computer or improvement in OS or programming language. The present invention suggests that destruction of an instruction detected by an OS can be automatically recovered by improvement in computer, OS or programming language.

(Data Area)

The contents of a data area according to the present invention are as follows.

(1) Fourth area provided for each vector
(2) Three types of flags provided for each vector
(3) Only a single counter of the number of established subjects provided for a Scenario Function
(4) Only a single stack of the number of established subjects provided for a Scenario Function The contamination of the above (1) is detected by the scheme of the present program (described later) and automatically recovered. The contamination of the above (2) is detected by a virus watching algorithm (described later) established on the basis of the vector and automatically recovered. The contamination of the above (3) and (4) are detected as an underlying reason against the establishment of E42 (described later). Intentional contamination of an instructive statement also results in contamination of an instruction. Contamination of a comment statement (stationary statement) can be detected by adopting the comment statement (stationary statement) and a defined and known comment statement (stationary statement) as comparative constants and by obtaining XOR of both the constants upon execution. This scheme can be established by vectors described later. In the present invention, this solution is called a vaccine method. In the present invention, contamination of the comment statement (stationary statement) is regarded as a stationary arrangement problem. The stationary arrangement problem serves as a cause of contaminating moving images or pictures in the web programming field.

(Gist of Present Invention)

FIGS. 1A and 1C show the gist of the present invention. In FIG. 1A, reference numeral 1A-1 denotes a memory area of a computer. Reference numeral 1A-10 denotes a conventional program. Reference numeral 1A-11 denotes the program of the present invention. The conventional program is contaminated with a virus. Even when the program of the present invention is contaminated with a virus, the program according to the present invention is not contaminated because of unassisted disinfection by itself. In FIG. 10, reference numeral 1C-1 denotes a memory area of a computer. Reference numeral 1C-10 denotes a conventional program. Reference numeral 1C-11 denotes the program of the present invention. Reference numeral 1C-2 denotes a virus. The conventional program is contaminated with a virus. However, even if the program of the present invention is contaminated, the program according to the present invention unassistedly disinfects the contamination by itself. This means that the program is not overwritten by the virus. This diagram shows the situations.

As shown in both the figures, the present invention is according to the following concepts.

(1) The present program in operation allows viral invasion.
(2) The program of the present invention unassistedly disables the invading virus by itself in the intervals of the original operation.
(3) Consequently, according to the present program, even with presence of the virus, the virus problems become absent.

(4) Under the current OS, every program stops when encountering destruction of an instruction; this is also applied to the present program. The present invention proposes that a program for automatically performing continuous restart after emergency stop should be prepared. This program is called SLP (Soft Landing Program).

(5) Resultantly, the present program has a scheme that does not allow occurrence of any viral symptom other than destruction of an instruction even with viral invasion. The present invention has also found that when a program obtains a scheme of creating justified subject genealogy, the program problems including virus problems are resultantly solved.

(Necessity of Renaissance)

As described above, a solution to the program problems and virus problems is established by a Scenario Function. The underlying reason of preventing the Scenario Function from becoming widespread is described here. The danger of making the program by means of replacing the program problems with the system convenience on the basis only of a programming language has been known as the software crisis since the beginning of 1970s. However, in reminiscence of the development in this field for half a century up to the present, the problems should have been solved by 1990.

Since 1990, the method in this field running away with the path for returning being lost steadily buries this field in unresolved problems and makes the state internally reside. It can be considered that the virus problems currently shaking the foundation of this field provide the last chance of normalizing this field. The present invention regards the virus problem as the problems of program structure, and provides a simple and clear solution thereto. The way of solution can be considered to clarify what this field has overlooked.

The way of creating programs in this quarter-century after 1990s during which programs have ascertained only in view of programming languages has ironically allowed computer products to be significantly widespread. It should however be said that the underside is filled with inconsistency. The biggest problem thereof is the fact that no expert has been developed. For example, the widespread irrational argument that the virus problems are solved by prevention before invasion is a proof thereof.

In view of another aspect, in consideration that programs are descried matter, the creation method (methodology) is indispensable to create the programs. It should be also noticed that the program description method is established based only on a program having the duplicability. However, as long as insufficient development in human resources and a logic connection-type program are adopted as the basics, paradigm shift of this field to a paradigm where such recognition is reached is considered to be difficult. That is, a fatalistic defect that the meaning of a logic connection-type description method cannot be ascertained should also be noticed. This problem also results in a situation where even if the problem is allowable in another field, increase in the number of programs causes a serious situation that cannot be disregarded.

Meanwhile, because of this defect of the logic connection-type program, it should also be noticed that the same creation method becomes widespread even with the difference in religion, thought and institutional systems. Consequently, it can be understood that only with programs, their defects have created in the scale of human beings as apparent in the virus problem. Such widespread use of programs in the scale of human beings resultantly causes a crisis in the scale of human beings. To avoid this problem, a self vaccine for revolution of consciousness is required. With this regard, a Renaissance reform is required to be demonstrated for the way of creating programs.

(Overview of Resolution to Problems According to Present Application)

In the present application, as to contamination of a data area for a program in operation caused by a virus invading the program, replacement of the program with the program of the present invention (hereinafter also called "the present program") allows the present program to regard the contamination as predicate inconsistency occurring in execution and thus to detect automatically contamination at any spot pertaining to the present program, and to eliminate to automatically the contamination, thereby continuing the original operation of the present program. The definition structure of the present program described above is a resolution to the problems specific to the present application.

In consideration of legitimacy evaluation of vectors observed without exception in a first rule of each of all the vectors which are configuration elements of the present program and legitimacy evaluation of subjects observed without exception in a third rule, engagement of viral contamination causes predicate inconsistency in these evaluations. A scheme of detecting the predicate inconsistency is a resolution to problems specific to the present application.

Furthermore, a scheme of autonomously initializing a contaminated spot of the present program and automatically removing the contamination (also called "virus watching algorithm") is a resolution to problems specific to the present application.

More fundamentally, a scheme which serves as the basis of the present program and actualizes the finding pertaining to the perception that programs are subject genealogies, that is, the Scenario Function, also constitutes the resolution to problems specific to the present application.

The universal scheme (including Coordinate Functions, and Synchronization Functions) that determines the subject genealogy (FIG. 12) and is cannot be imagined as the extension of conventional programs constitutes the resolution to problems specific to the present application.

Furthermore, in view that the present program is the scheme of generating justified subject genealogy, as a result, the present program results in the scheme of solving the virus problems with being provided with no virus information at all.

The present program is effective not only to a program that is a specific part of a computer system but also to any programs in all the fields.

(Specific Resolution to Problems According to Present Application)

Specifically, to resolve the above problems, an autonomous virus solution program according to the present invention includes: a contamination detection mechanism for unassistedly detecting contamination in case a predetermined memory area for a program in an execution state is contaminated with anti-intent information against intent on the program because of any reason; a decontamination mechanism for unassistedly disinfecting the contamination detected by the contamination detection mechanism; and a normal state recovery mechanism for causing the memory area to recover a normal state automatically.

Here, the "contamination" is every action that changes information against an original intent, in a memory area for the program, and is a concept that includes modes of forgery, rewriting, and destruction.

According to adoption of such a configuration, even in case external data or an instructive statement including an originally undesirable computer virus invade the memory area, the present invention regards the invasion as the contamination of the memory area instead of the virus problems, and the contaminated memory area is autonomously disinfected immediately upon the invasion is ascertained.

In this case, the contamination detection mechanism may have a structure that finds logical inconsistency related to the first information area. This structure can replace computer virus invasion that is a situation having a limitation by a pattern recognition method with an algorithm capable of objectively ascertaining without exception. In this case, it is preferred that the contamination detection mechanism have a structure of a vector that includes first to seventh rules.

Furthermore, in the above case, the decontamination mechanism the decontamination structure may include an initialization mechanism for initializing the vector. More specifically, the decontamination mechanism may initialize the vector at timing before appearance of a symptom intended and caused by the anti-intent information with which the contamination is ascertained. According to this structure, the data area having a possibility of viral contamination, such as invasion of a computer virus, is autonomously and automatically initialized. Consequently, an occasion on which the virus performs so-called "wrongdoing" can be prevented from occurring.

Also in this case, more specifically, the decontamination structure may initialize the vector at timing before appearance of a symptom intended and caused by the anti-intent information with which the contamination is ascertained. Thus, the virus is disinfected before occurrence of the opportunity of virus's performing so-called "wrongdoing". Consequently, the computer virus invasion problem itself can be eliminated.

Furthermore, the vector may have a structure that adds optimal timing to the contamination detection mechanism and/or the decontamination mechanism.

Furthermore, the normal state recovery mechanism may have a restart mechanism that is established in the program.

Moreover, the vector pertaining to the contamination detection mechanism may include at least a second flag that indicates passage through the second rule, a sixth flag for requesting restart of the vector itself, a seventh flag for declaring a temporary stop of the restart of the vector itself, and a fourth area that is an area evaluated by the third rule and determined by the fourth rule, and the contamination detection mechanism may include a three-type flags and fourth region relative relationship evaluating mechanism that evaluates relative relationship between the second, sixth and seventh flags and the fourth area.

Furthermore, the structure may include a fourth area genealogy legitimacy evaluating mechanism for evaluating legitimacy of genealogy of the fourth area in order to evaluate the legitimacy of the fourth area by the third rule of the vector. According to this configuration, a scheme 12 and a scheme 5 are schemes that evaluate the reasonableness of the fourth area, but have different evaluation timing. Consequently, the schemes of evaluation cannot be configured to be the same.

Furthermore, the structure may further include a fourth area genealogy achievement prediction mechanism that performs future prediction of achievement of genealogy of the fourth area using a stack of the number of achievements in the fourth area according to the fifth rule pertaining to the vector.

Furthermore, the structure may include an instruction contamination detection mechanism that detects instruction contamination that cannot be detected by an OS pertaining to the program.

Moreover, to solve the above problems, a definition structure of a program according to the present invention is a definition structure of an autonomous virus solution program for solving, as a program structure, a problem which a virus invading an operation program started on an OS (operating system) or a data area pertaining to the operation program can cause, the definition structure includes: a Coordinate Function-4 that has a structure cycling until a critical state of a Palette-4 where vector structures are accumulated in any order is achieved, the vector structure being a minimum predicate structure for determining content for a data area serving as a subject; a Coordinate Function-2 that has a structure cycling until a critical state of a Palette-2 where vector structures are accumulated in any order is achieved, the vector structure being a minimum predicate structure for determining content for a data area serving as a subject, a Coordinate Function-3 that has a structure cycling until a critical state of a Palette-3 where vector structures are accumulated in any order is achieved, the vector structure being a minimum predicate structure for determining content for a data area serving as a subject, a Synchronization Function that causes control to transition to the Palette-2 when the Palette-4 comes into the critical state, transition to the Palette-3 when the Palette-2 comes into the critical state, and transition to any of the Coordinate Function-3 pertaining to a highest rank, the Coordinate Function-4 pertaining to an identical rank, and the Coordinate Function-4 pertaining to a layer lower by one layer according to presence of a fourth area of a variable subject for establishing the subject when the Palette-3 comes into the critical state.

According to adoption of such a configuration, even in case external data or an instructive statement including an originally undesirable computer virus invades the first information area, the present invention operates, on the Scenario Function, the structure that the virus watching algorithm regards the invasion as the contamination of the first information area instead of the virus problems, and invasion of the virus is autonomously detected.

In this case, the vector may adopt a configuration that includes: a contamination detection mechanism for unassistedly detecting contamination in case the data area is contaminated because of any reason; a decontamination mechanism for disinfecting the contamination detected by the contamination detection mechanism; and a normal state recovery mechanism for causing the memory area to recover a normal state automatically. This structure is combined with the recursive structure of the Scenario Function, which can replace computer virus invasion that is a situation having a limitation by a pattern recognition method with an algorithm capable of objectively ascertaining without exception.

Furthermore, the vector may have a structure that adds optimal timing to the contamination detection mechanism and/or the decontamination mechanism.

Furthermore, the normal state recovery mechanism may have a restart mechanism that is established in the program.

Moreover, the vector pertaining to the contamination detection mechanism may include at least a second flag that indicates passage through the second rule, a sixth flag for requesting restart of the vector itself, a seventh flag for declaring a temporary stop of the restart of the vector itself, and a fourth area that is an area evaluated by the third rule and determined by the fourth rule, and the contamination detection mechanism may include a three-type flags and fourth region relative relationship evaluating mechanism that evaluates relative relationship between the second, sixth and seventh flags and the fourth area.

Furthermore, the structure may include a fourth area genealogy legitimacy evaluating mechanism for evaluating legitimacy of genealogy of the fourth area in order to evaluate the legitimacy of the fourth area by the third rule of the vector. According to this configuration, a scheme 12 and a scheme 5 are schemes that evaluate the reasonableness of the fourth area, but have different evaluation timing. Consequently, the schemes of evaluation cannot be configured to be the same.

Furthermore, the structure may further include a fourth area genealogy achievement prediction mechanism that performs future prediction of achievement of genealogy of the fourth area using a stack of the number of achievements in the fourth area according to the fifth rule pertaining to the vector.

Furthermore, the structure may include an instruction contamination detection mechanism that detects instruction contamination that cannot be detected by an OS pertaining to the program.

According to the present application having such a configuration, computer virus invasion that is a situation having a limitation by a pattern recognition method can be replaced with an algorithm capable of objectively ascertaining without exception, and the data area having a possibility of viral contamination, such as invasion of a computer virus, is autonomously and automatically initialized. Consequently, an occasion on which the virus performs so-called "wrongdoing" can be prevented from occurring.

In the above case, when the virus watching algorithm initializes the data area having a possibility of virus invasion, the algorithm can initialize the data area at timing before appearance of a symptom intended by the virus estimated to have invaded. Thus, the virus is disinfected before occurrence of the opportunity for the virus to perform so-called "wrongdoing". Consequently, the computer virus invasion problem itself can be eliminated.

The technical thought according to the invention of the present application described above can be implemented not only as the definition structure of the autonomous virus solution program as described above, but also as any of an autonomous virus solution program, an autonomous virus solution device, and an autonomous virus solution method which include substantially analogous invention identifying elements, and a storage medium that stores such a program.

Advantageous Effects of Invention

The present invention provides an intrinsic solution to virus problems. That is, even if a virus invades a program in operation according to the present invention (hereinafter also called "the present program"), regardless of the timing and means of invasion and the number of attempts thereof, the present program autonomously detects the virus as contamination of a memory area used by the present program and disinfects the contamination for quick recovery in order to continue the normal operation of the present program.

The present program regards contamination (virus) as false information against the intent of the present program. The present program has the scheme where presence of false information causes predicate inconsistency in this program. The present program detects contamination using this scheme. In addition, the present program does not treat an invading virus as a virus, but treats the virus by the scheme of predicate inconsistency occurring in the present program according to the present invention instead. The present program then disinfects the contamination using a scheme in accordance with the present invention. The disinfection has the same meaning as destruction of the intent of an invading virus.

Timing for detecting contamination and timing for disinfecting the contamination are timing according to the present invention. Consequently, the invading virus is disabled before occurrence of the intended symptoms of the virus. That is, based on the present program, viral invasion problems and viral symptom problems are not solved as virus problems. The present program is a scheme of preventing the virus problems from occurring in the present program even with viral invasion. The scheme of the present program thus serves as a solution to the virus problems.

Consequently, this frees these industries from the virus problems causing trouble to the industries, at a stroke.

BRIEF DESCRIPTION OF DRAWINGS

FIG. 1E is a diagram of comparative analysis between an establishment trajectory (left side) of nouns in a conventional program according to program dynamic analysis and an establishment trajectory (right side) of nouns in a program according to a Scenario Function of the present application.

FIG. 2 is a diagram showing types of vectors used by the present program according to one embodiment of the present invention.

FIG. 4B is a diagram showing the relative relationship of a fourth area, a second flag, a sixth flag and a seventh flag for ascertaining the legitimacy of vectors used by the present program according to one embodiment of the present invention.

FIG. 6 is a diagram showing a stack structure of the number of established subjects used by the present program according to one embodiment of the present invention.

FIG. 11A is a diagram showing a left side of a part of a frame defined as a LYEE Space according to one embodiment of the present invention with respect to the example exemplified in FIG. 10.

FIG. 11B is a diagram showing a right side of a part of a frame defined as a LYEE Space according to one embodiment of the present invention with respect to the example exemplified in FIG. 10.

FIG. 13 is a diagram for showing the present program at a position in the rank structure of the present program to which subjects belonging to the present program according to one embodiment of the present invention belong.

DESCRIPTION OF EMBODIMENTS

Embodiments of the present invention are hereinafter described with reference to the drawings. A range required for description for achieving the object of the present invention is schematically described below. The range required for a description of the part concerned in the present invention is mainly described. Parts which are not described are according to publicly known techniques.

(Derivation of Establishment of Present Invention)

The conventional programs are based on the logic connection-type description method, which is the reason that the completeness of the programs cannot be established. However, the logic connection-type description method is a custom we inherently have. Thus, the way the programs are internally has many programs as seen in the program problems. There is a problem in that the familiarity of the description method is an implicit premise of allowing these problems.

Here, an axiom reached as a premise in order to describe a universal structure of a program achieved by the present invention, "structure of establishing meaning" is described. Subsequently, a concept achieved by the present application as a scheme of deriving meaning on the basis of the axiom of the structure of meaning is described. A resolution to the direct problems of the present application, how to disable a virus, is described on the basis of the concept.

(Concept of Meaning)

Meaning is wholeness (connotational scene). We, who are natural existences, are parts. Consequently, even though we have words "meaning" and "wholeness", the connotational scene of the entity cannot be described as our memories. What we can do is limited to genealogize (logicalize) from parts and imagine the meaning and wholeness associatively.

(Where Meaning Resides)

It is assumed that meaning resides in our minds.

(Scheme of Meaning)

The scheme of meaning is a solution (S) of a Scenario Function. The scheme of meaning is a model of meaning existing in our minds. The Scenario Function establishes the genealogy for a subject according to the dynamics (data connection) of this function. This is the model of meaning (see FIG. 12). The genealogy for a subject is more similar to the concept of wholeness than the logic. Because of the characteristics, the genealogy for a subject is called the scheme of meaning.

Figure 10:
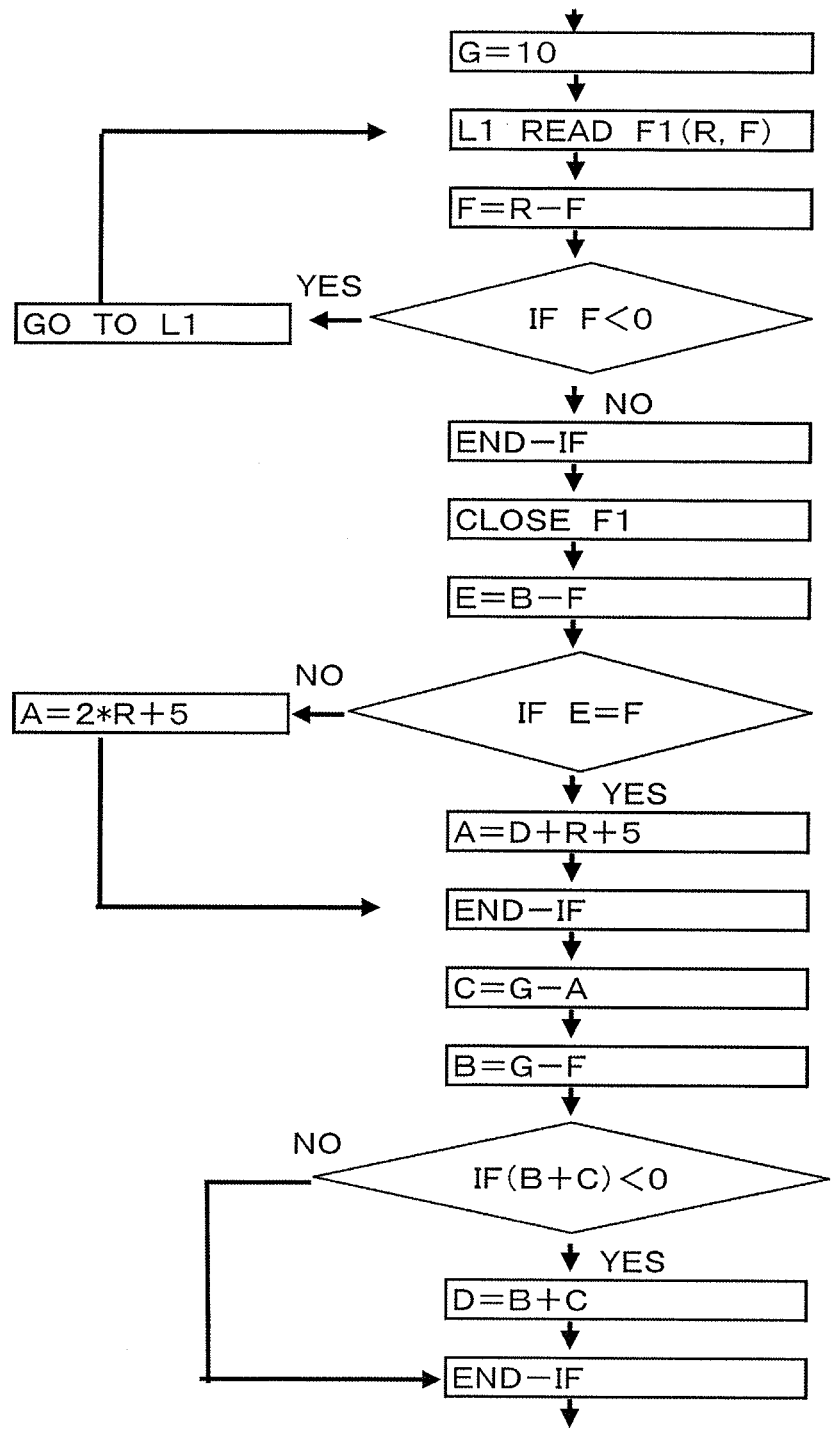
FIG. 10 is a flowchart of a part of a conventional program (logic connection type) exemplified as an exemplary case.

The scheme of meaning is the genealogy of a fourth area (subject) of five types of vectors L4, L2, L3, R2 and W4 of the Scenario Function. The scheme of meaning is newly regarded so as to be recognizable to us who have the logic connection-type thinking method. The scheme of meaning can be obtained by converting the Scenario Function into a logic connection-type program, obtaining the LYEE Space (FIGS. 11A and 11B) and inputting LYEE into a graphically representing tool. Technically, the scheme of meaning can be obtained from a metalinguistically represented unit statement. The metalinguistically represented unit statement can be seen in the LYEE Space. The graphically representing tool has already been on the market. The algorithm of automatically converting a Scenario Function into a logic connection-type program has already been obtained in the research of the present invention. The algorithm of automatically obtaining the LYEE Space from the logic connection-type program has already been obtained in the research of the present invention. The way of the scheme of meaning is described according to a scheme of meaning (FIG. 12) obtained from a partial example of a logic connection-type program (FIG. 10). The LYEE Space of the partial example (FIG. 10) is identified with reference to FIGS. 11A and 11B.

(Structure of Scheme of Meaning)

The dynamics of the conventional program, that is, the trajectory of execution of an instruction with an area being regarded as a node has so-called a spaghetti form. Meanwhile, the dynamics of the Scenario Function has a comb form. According to the genealogy for a subject, both have the same scheme of meaning. This is the characteristics of the scheme of meaning. The scheme of meaning is used for the discussion of identifying how far the effect of possible contamination of a subject and a constant value with a virus reaches and in order to limit the disabling range of contamination. Consequently, disablement of the contamination of the constant value, subject, and variable subject can obtain a result that the contamination problems can be solved. This can be seen in a program model (described below).

(Path)

Figure 12:
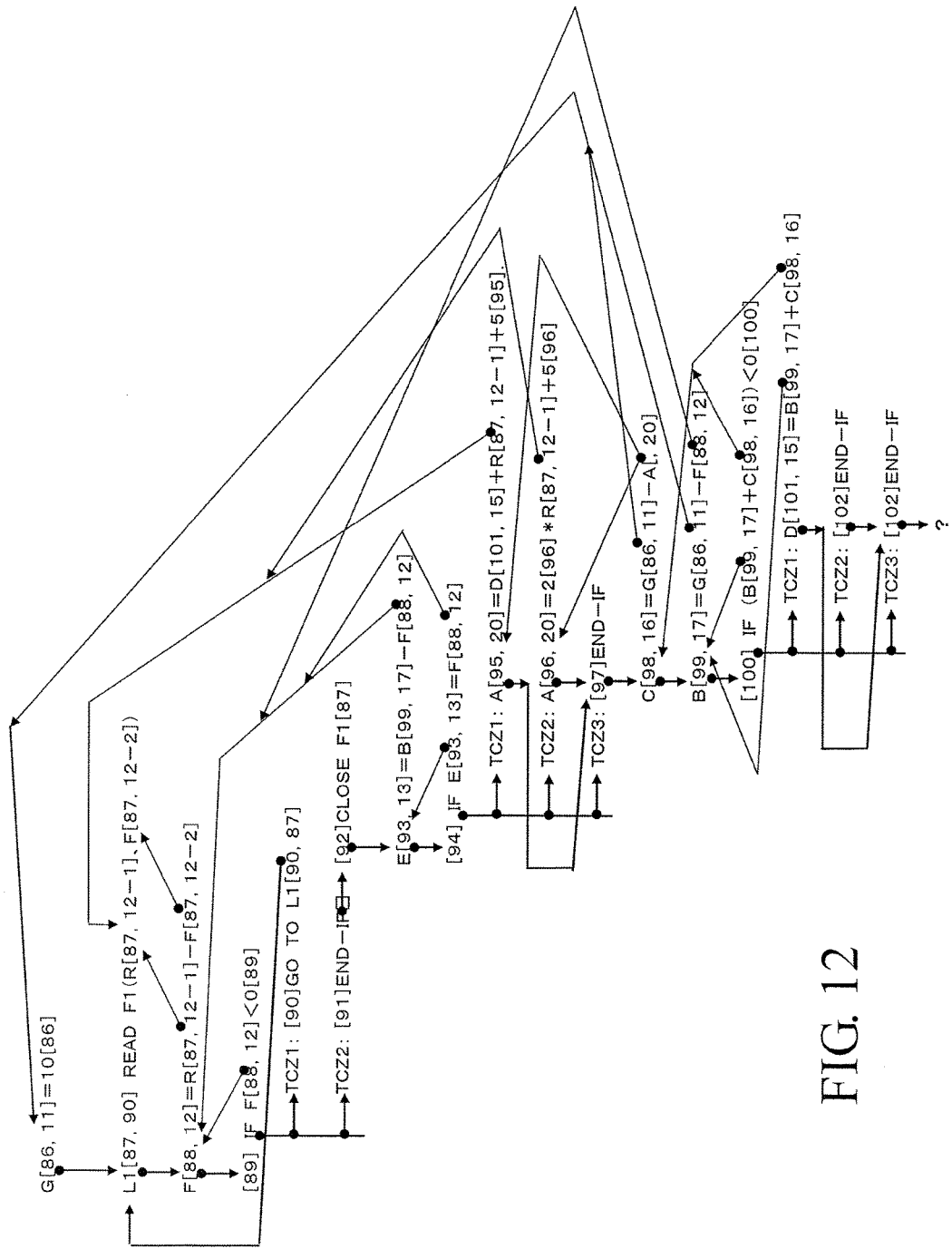
FIG. 12 is a diagram showing a scheme of meaning according to one embodiment of the present invention with respect to the example exemplified in FIG. 10.

FIG. 12 is a diagram showing the scheme of meaning. Thick solid lines in FIG. 12 are lines in a flowchart of FIG. 10. Narrow lines are not shown in the flowchart and are relation lines that compensate the lines of the flowchart and represent the scheme of meaning. The number of lines shown in FIG. 10 (hereinafter also called "paths") is 20. The number of paths equivalent to that in FIG. 12 is 22. FIG. 12 has a larger number, 2 of paths because FIG. 12 has higher strictness. The paths are established in Harmonization Coordinates. Consequently, the paths are represented as Harmonization genealogy. On the other hand, 16 paths appear in FIG. 12. This path can be ascertained in Metalinguistic Coordinates. Consequently, this path is represented as Metalinguistic genealogy. The Metalinguistic genealogy appears in FIG. 12 but does not appear in FIG. 10. This is the characteristics of the scheme of meaning (genealogy for a subject). This is a proof of further wholeness in FIG. 12 than in FIG. 10.

The Harmonization genealogy is the path of functional dynamics. However, the Metalinguistic genealogy is not the path of dynamics. This genealogy is a path that represents the derivation of a subject, that is, how the subject has been established. In other words, this is a path for ascertaining the meaning of the subject. If the Metalinguistic genealogy does not reflect intent, for example, if the order of the subject in the Metalinguistic genealogy does not reflect intent, a problem occurs in the Harmonization genealogy. In other words, heretofore, if there is a problem in the Harmonization genealogy, i.e., the flowchart, we try to identify the cause of the problem in the Harmonization genealogy, that is, on the flowchart. However, as we have experience in a program test, this is not so simple. Use of the scheme of meaning allows the case of the problem occurring in the Harmonization genealogy to be observed as an error of the order of subjects in the Metalinguistic genealogy. It is difficult to search for the error of the order of subjects in the Harmonization genealogy.

(Items of LYEE Space)

FIG. 10 is a flowchart showing a logic connection-type program. FIGS. 11A and 11B show a LYEE Space of this program. The items of LYEE required to obtain the scheme of meaning are described.

1) The program in FIG. 10 is used as an exemplary case.
2) A statement type is the type of a unitized program statement structure.
The number of types of unit statements is ten.
3) 12 vector types correspond to the statement types except the area statement.
4) A subject is the solution of a unit statement.
5) A cooperative statement is a unit statement with no subject. These constitute a context in view of belonging to a unit statement having a subject. The context is the minimum unit of the scheme of meaning.

(Harmonization Coordinate)

6) A line number is a position of a unit statement in the program.
7) Harmonization Coordinates are six types of coordinates for ascertaining situations of execution of a unit statement.
a. TCX is the position of a unit statement in the program and operates in cooperation with the line number.
b. TCY is TCX of the unit statement where the unit statement unconditionally advances to the next.
c. TCZ1 is TCX of the unit statement that advances to the next if the unit is true in a conditional statement.
d. TCZ2 is TCX of the unit statement that advances to the next if the unit is false in a conditional statement.
e. TCZ3 is TCX of the unit statement at the end of the range covered by the conditional statement.
f. TCZ4 is TCX of the unit statement where the unit statement of TCZ3 advances to the next.
8) The metalinguistically represented unit statement is a unit statement having constitution items (the subject, variable subject, constant value, stationary arrangement, and indicator) to which Harmonization Coordinates are added.

(Harmonization Genealogy and Metalinguistic Genealogy)

The unit statements are sequentially ordered according to the Harmonization Coordinates (FIGS. 11A and 11B). This shows situations equivalent to those of the flowchart of the program example (FIG. 10). In the scheme of meaning (FIG. 12), this is represented as Harmonization genealogy. The unit statement in the flowchart is replaced with a metalinguistically represented unit statement in the scheme of meaning. It can be understood according to the LYEE Space in FIGS. 11A and 11B that Harmonization Coordinates are added to all the constitution items of the metalinguistically represented unit statement. The genealogy of the constitution items is obtained through use thereof. This is represented as Metalinguistic genealogy. See LYEE Space (FIGS. 11A and 11B).

For example, in the unit statement G=10 on the line number 86, the noun serving as the subject is G. 10 thereof is represented as a constant value. This unit statement is metalinguistically represented as G[86, 11]=10[86]. 86 indicates that TCX where the statement structure is placed is 86.

The TCX86 coincides with the line number 86. There is a statement structure where the unit statement has multiple functions. In a case of replacement with multiple unit statements, the statement structure having the multiple functions have a line number, and the unitized unit statements have the line number of the statement structure having the multiple functions and are assigned branch numbers, which form TCXs of the respective unit statements. 11 of G[86, 11] indicates that an area definition statement is placed at TCX: 11. The area definition statement is omitted from the LYEE Space. Consequently, the statement cannot be seen. 10[86] has a constant value of 10. The constant value of this form has no area on the program. Consequently, this representation indicates that the position of TCX: 86 of G[86, 11] is 10.

The unit statement on the line number 98 is C=G−A. The metalinguistic representation of this unit statement is C[98, 16]=G[86, 11]−A[, 20]. A[, 20] does not have TCX of A, which cannot be displayed, because TCX of A covers 95 and 96 and established one of them is to be adopted and is unidentified at this stage.

G[86, 11] is used for this unit statement. This G[86, 11] is derived from TCX: 86. Consequently, in this case, according to the scheme of meaning, the genealogy from G[86, 11] of C[98, 16]=G[86, 11]−A[, 20] to G[86, 11] of G[86, 11]=10[86] is established as Metalinguistic genealogy.

C[98, 16] of C[98, 16]=G[86, 11]−A[, 20] is used in [100,] IF(B[99, 17]+C[98, 16])<0. That is, C[98, 16] of [100,]IF is derived from TCX: 98. Consequently, in this case, according to the scheme of meaning, the genealogy from C[98, 16] of [100,] IF(B[99, 17]+C[98, 16])<0 to C[98, 16] of C[98, 16]=G[86, 11]−A[, 20] is established as Metalinguistic genealogy. [100,] IF indicates the placement at TCX: 100. Since IF is not a subject, the area thereof does not exist. Consequently, this is represented as [100,]IF.

(Guidance of Scheme of Meaning)

As described above, the scheme of meaning, that is the genealogy for noun, can be generated using the coordinates. Consequently, irrespective of a conventional program or the present program, a noun belonging to the program can be comprehensively ascertained as a subject. As described above, "as a subject" means that the noun is genealogized by means of the Harmonization Coordinate and Metalinguistic Coordinate. That is, in consideration only that these coordinates ascertain the relationship of subjectifying the noun, even if the noun is genealogize in these coordinates, this means the genealogization as the subject. This is the point of the scheme of meaning.

In the present invention, the Harmonization Coordinate and Metalinguistic Coordinate achieve this. As shown in FIG. 12, the path of Harmonization genealogy is genealogy of logic connection. This coincides with the conventional flowchart. Likewise, the Metalinguistic genealogy is genealogy of data connection. This does not appear in the conventional flowchart. In the mind of a person seeing the flowchart, this context appears as the meaning of the flowchart. In other words, the Metalinguistic genealogy ascertains the meaning appearing in the mind.

Various utility values for the scheme of meaning can be considered.

(1) For example, the establishment relationship where one subject (noun) is established with other subjects can be visually identified. The establishment relationship cannot be completely pictured by people without this scheme of meaning. In this sense, acquisition of the scheme of meaning achieves a scene which people visually identify for the first time.

(2) The order (subject order sequence) in the network (genealogy) of nouns (subject) of the scheme of meaning ascertains the establishment and derivation. Consequently, use of this allows visual observation on whether the intent of a person having a need is reasonably ascertained by the program.

(3) The scheme of meaning allows observation on what part of program is to be tested.

The description on "structure of establishing meaning" which is the axiom achieved by the present invention as a premise has thus been completed. Next, the relationship between the program and the Scenario Function according to the present invention.

The derivation of establishment of the program according to the present invention (hereinafter also called "the present program") is regarded as the data connection-type description method with respect to the logic connection-type description method. This description method is different from our previous instinctive nature. Consequently, we cannot feel familiarity with the method. We cannot feel familiarity with the present program without change in way of thinking. According to the logic connection-type description method, the way of tracing genealogy for a subject is through reuse of knowledge (logic) of subjectifying a noun. Consequently, a person making description can recognize the intent even though the degree is insufficient. On the contrary, according to the data connection-type description method, the person making description cannot get recognition without obtaining the solution of the description (see FIG. 12).

The Scenario Function clearly demonstrates that people making description are not required to know the intents. This point allows the present program to serve as a scheme of establishing the completeness of the program. Unlike the present program, the conventional program cannot solve the program problems or the virus problems. On the contrary, the present program can solve the program problems and the virus problems. Furthermore, the present program has the first program structure in the world in view of capability of describing the basis universally.

For example, this Description summarizes "scheme for disabling a virus" into 15 schemes. These are established only based on the Scenario Function. However, the conventional programs cannot establish any one of them. In view of common sense in virus problems, while the basis is apparent, the basis is also described "disabling viruses" in this Description. Here, the Scenario Function, which serves as the basis of the present program, is required to be ascertained together. The Scenario Function is described in "definitive expression of Scenario Function" in this Description.

Figure 1A:
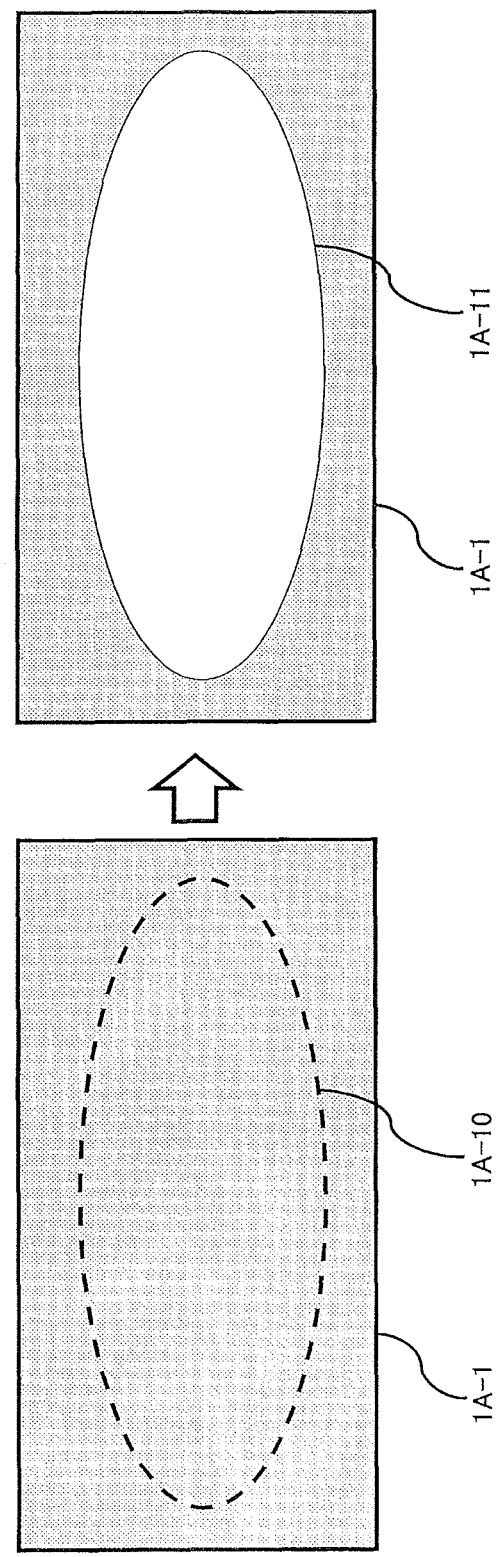
FIG. 1A is a conceptual diagram showing advantageous effects of a program according to one embodiment of the present invention.
Figure 1B:
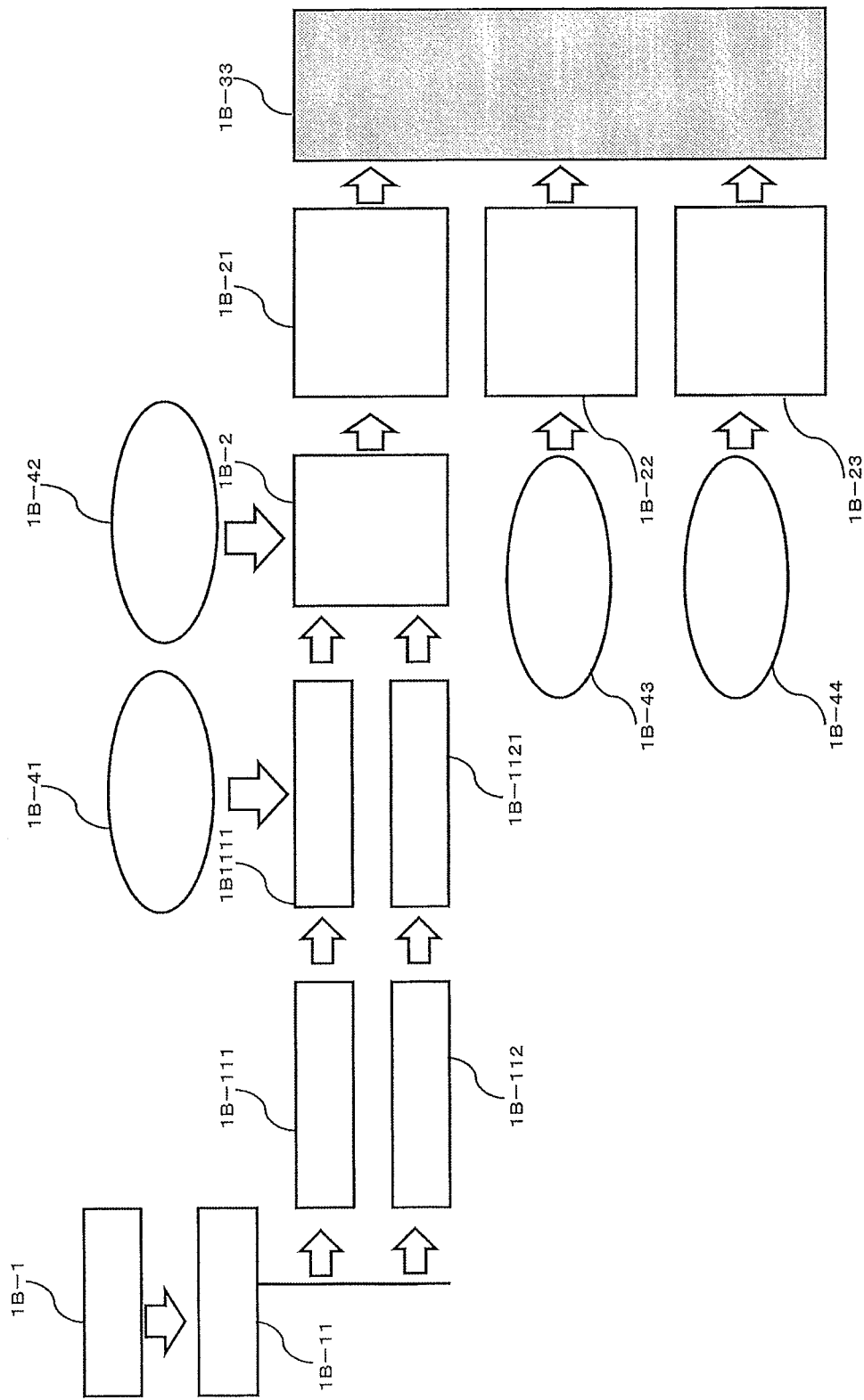
FIG. 1B is a conceptual diagram showing procedures of deriving the program of the present invention from a conventional program.
Figure 1C:
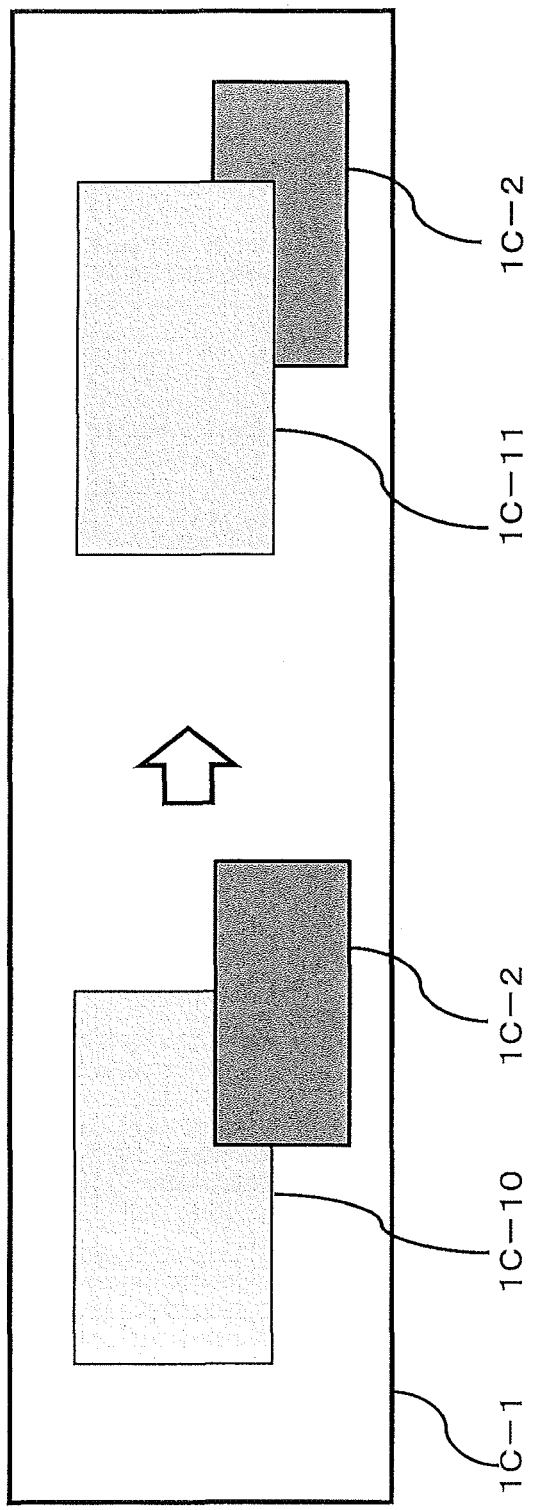
FIG. 1C is a conceptual diagram showing advantageous effects of the present program according to one embodiment of the present invention.
Figure 1D:
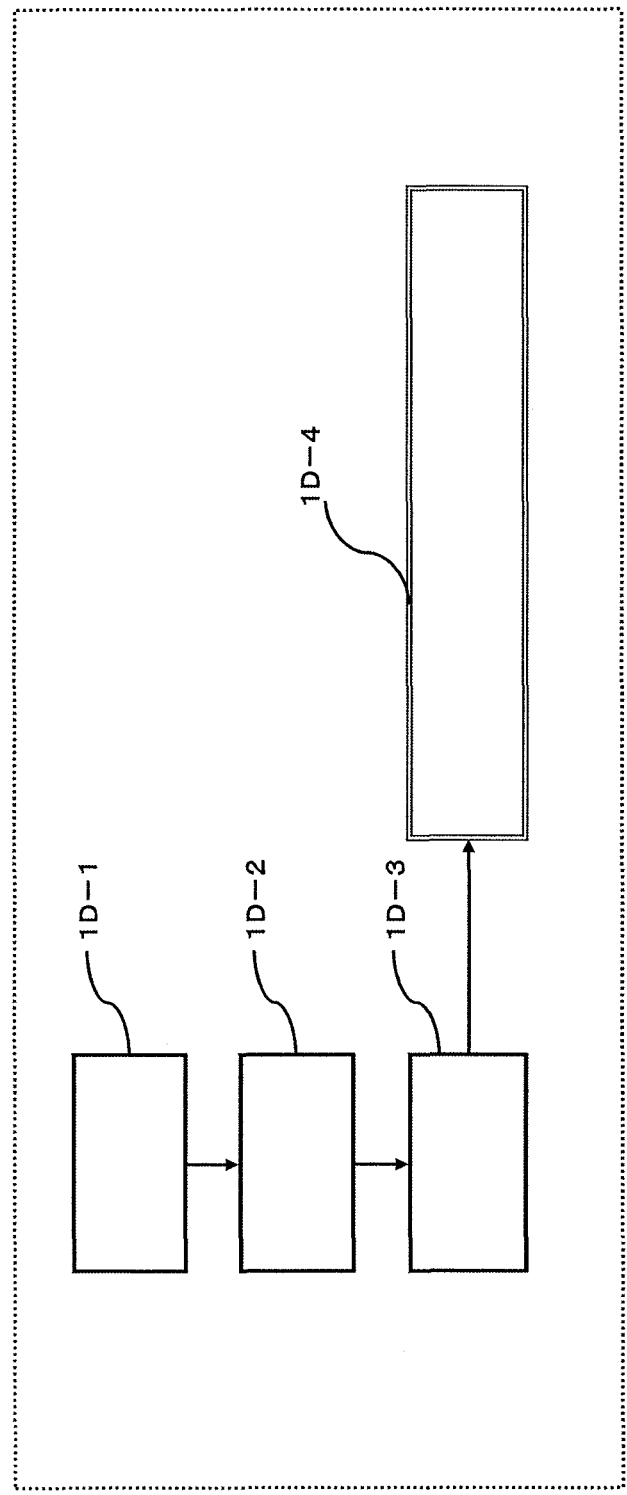
FIG. 1D is a diagram showing an established main concept in a research process of the present invention.

FIG. 1B is a conceptual diagram showing procedures of deriving the program of the present invention from a conventional program. In this diagram, reference numeral 1B-1 denotes the source code of the conventional program, reference numeral 1B-11 denotes the LYEE Space of the conventional program (see FIGS. 11A and 11B), and reference numeral 1B-111 denotes an operation of extracting an instructive statement ruled by the Subject Vector from the LYEE Space. Reference numeral 1B-1111 denotes creation of the vector that rules the extracted instructive statement. Reference numeral 1B-112 is an operation of extracting the instructive statement ruled by the L4 Control Vector from the LYEE Space. Reference numeral 1B-1121 denotes creation of the vector that rules the extracted instructive statement. Reference numeral 1B-41 denotes that the program model of the Subject Vectors is attached to this Description.

Reference numeral 1B-42 denotes that the program model of the virus watching algorithm (VWA) is attached to this Description. Reference numeral 1B-43 denotes that the program model of the Control Vectors is attached to this Description. Reference numeral 1B-44 denotes that the program model of the three types of Coordinate Functions serving as the basic program of the program according to the present invention and Synchronization Function are attached to this Description. Reference numeral 1B-2 denotes creation of VWA based on the created vector. Reference numeral 1B-21 denotes an operation of completing the Subject Vector using the created VWA. Reference numeral 1B-22 denotes an operation of completing the Control Vector using the created VWA and the model of the Control Vector. Reference numeral 1B-23 denotes an operation of completing the basic program using the model of the basic program. Reference numeral 1B-3 denotes an operation of editing the program of the present invention using the results of 1B-21, 1B-22 and 1B-23 in order to complete the program of the present invention. This diagram shows that (1) the present program is a theory of solving the virus problem, and (2) the virus problems can be solved by the program.

Ascertaining the Scenario Function according to the present invention allows the followings to be recognized.

(1) Artificial definition of one of the seven rules included in vectors of configuration elements of the present program, in turn, defines the entire code constituting the present program.

(2) The above (1) is a proof that the present program is universal.

(3) The relationship in FIG. 1B is a proof that if the conventional program exists, the present program also exits.

(4) The model of the present program attached to this Description is a proof of the above (1), (2) and (3).

(5) As to the instructive statement determining the present program, preliminary definition of information for discriminating the statement type allows automatic collection from a conventional program using this definition (see FIGS. 11A and 11B (LYEE Space)).

(6) The instructive statement determining the present program is used for five types of Subject Vectors that include L4 Control Vectors in 12 types of vectors constituting the present program. It is determined which vector uses which instructive statement, without exception. This is described in the section on vectors in this Description.

It should be also noted that the vector functions as a scheme for determining the instructive statement. When vectors are determined, the programs called Coordinate Functions, Synchronization Functions, Control Vectors, VWAs (virus watching algorithms) which constitute the present program are determined accordingly. See the attached description, structure diagram, and program model. According to such a scheme, the present program:

(1) achieves the same original operation as the conventional program, and (2) solves the virus problems in parallel. Walking through the present program allows the (1) and (2) roles to be ascertained to have been achieved.

In consideration that the program is the scheme that subjectifies a noun and traces genealogy for the subject, the dynamics of the Scenario Function can be understood. The function of program is nothing but a scheme of tracing genealogy for a subject. This point is also applicable to the conventional program. While the program performs data processing, it can be more appropriately said that the program generates the subject genealogy. Consequently, the present invention also serves as a proof theory of existence of a program of solving the virus problems.

(Definitive Expression of Scenario Function)

Next, the Scenario Function serving as the basis of the program is described. The Scenario Function is nothing more or less than what is called a program of a computer. In view of the functional role of the program, the Scenario Function is a program nothing more or less than the conventional program. The Scenario Function is represented by the following definitive expression. That is, $$S=\Phi 0(\Phi 4(\{L4\},\{W4\},E41,E42,T4)+\Phi 2(\{L2\},\{R2\},T2)+\Phi 3(\{L3\},T31,T32,T33))$$

The Scenario Function is the program structure that can be determined and represented by the definitive expression and is the first in the world. Every symbol on the right hand side is a program derived by the determinism. The symbols of the definitive expression of Scenario Function are described below.

(Solution of Scenario Function)

In the Scenario Function, a concept of solution, which is not in the conventional program, is established. The solution (S) of the Scenario Function is not the execution order of nouns or instructive statements, but is the situation of data connection of subjects. This is also called a scheme of meaning (see FIG. 12). The scheme of meaning is the entire scene of the dynamics of Scenario Function. A method of obtaining the solution of the Scenario Function is described in the section of scheme of meaning. The flowchart of logic up to this point corresponds to the solution of the Scenario Function. In the present invention, the entire scene of dynamics is positioned as an ultimate (extensive) situation toward the contour of entirety which is assumed to exist. The vectors, Coordinate Functions and Synchronization Functions are schemes for extensively establishing the data connection of subjects serving as the solution of Scenario Function, to the possible limit.

(Structure of Vector)

Figure 3:
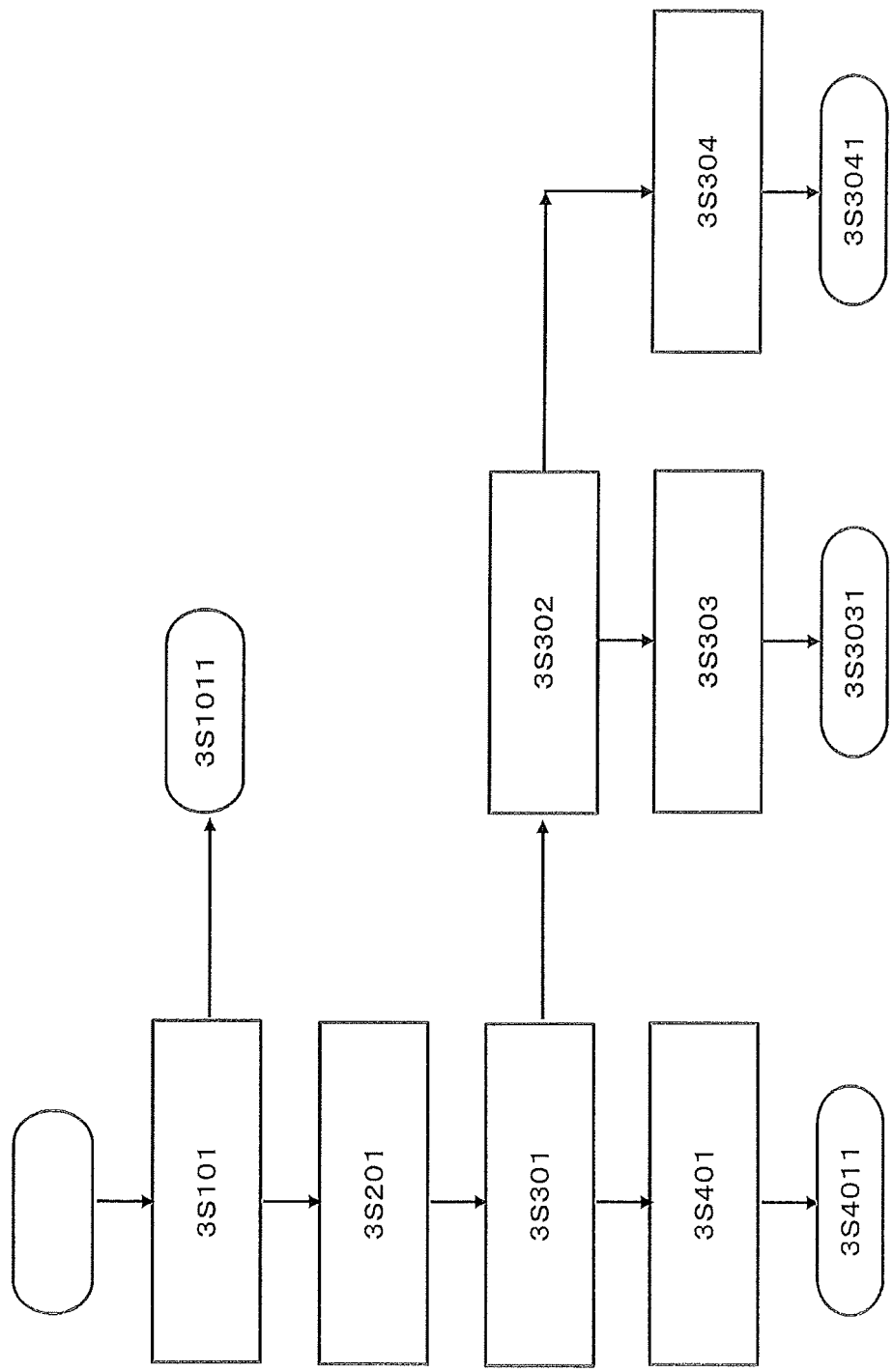
FIG. 3 is a conceptual diagram of vectors established with seven rules and four exits according to one embodiment of the present invention.

FIG. 3 (basic structure of vector) is referred to. As shown in this diagram, the vectors include seven types of description rules. These types are represented as first, second, third, fourth, fifth, sixth and seventh rules. 3S101 denotes the first rule, where it is evaluated whether to advance to the second rule or finishes here. 3S1011 denotes an exit of the first rule. 3S201 denotes the second rule, where a process original to the vector is executed. 3S301 denotes the third rule, where evaluation pertaining to the original process for the vector is executed. 3S401 denotes the fourth rule, which is the affirmative consequence of the third rule and where the original process of vector is completed. 3S4011 denotes an exit for completion of the original process of vector. 3S302 denotes the fifth rule, where the process is performed as the negative consequence of the third rule. 3S303 denotes the sixth rule, which is the affirmative consequence of the fifth rule and where the vector requires restart. 353031 denotes an exit of the sixth rule. 3S304 denotes the seventh rule, which is the negative consequence of the fifth rule and where the vector requires to stop restart. 3S3041 denotes the exit of the seventh rule.

As shown in this diagram, the start point of vector is at a single site and is the first rule. The end points (exits) of the vectors are at four sites, and are the first, fourth, sixth and seventh rules. The states of vectors finishing the role at the four end points (exits) are called the legitimacy of vector (see the section of vector legitimacy). The vector intrinsically has two types of flags (the sixth and seventh flags). The second flag is added for the sake of the present program that takes measures against viruses. The second flag represents a proof of passage of the second rule with own on-state. The sixth flag requests own restart with own on-state. The seventh flag declares temporary stop of restart with own on-state. The third, fifth, sixth and seventh rules of vector are schemes for vector restart structure (see the section of restart structure).

(Legitimacy of Fourth Area)

The fourth area is suggested by an instruction ruled by the vector. The third rule of vector evaluates the legitimacy of the fourth area, and when the area is not legitimate, this rule issues an instruction of advancing to the fifth rule in order to urge vector restart. The legitimate fourth area is evaluated by the third rule and determined by the fourth rule. The legitimate fourth area means that the fourth area is not contaminated. The fourth area suggested by the instructive statement ruled by the vector can be determined to be legitimate if all the variable subjects related to establishment of this instructive statement are legitimate. This evaluation is performed by the third rule. This evaluation is represented as the legitimacy of the fourth area.

(Structure of Vector)

Figure 4A:
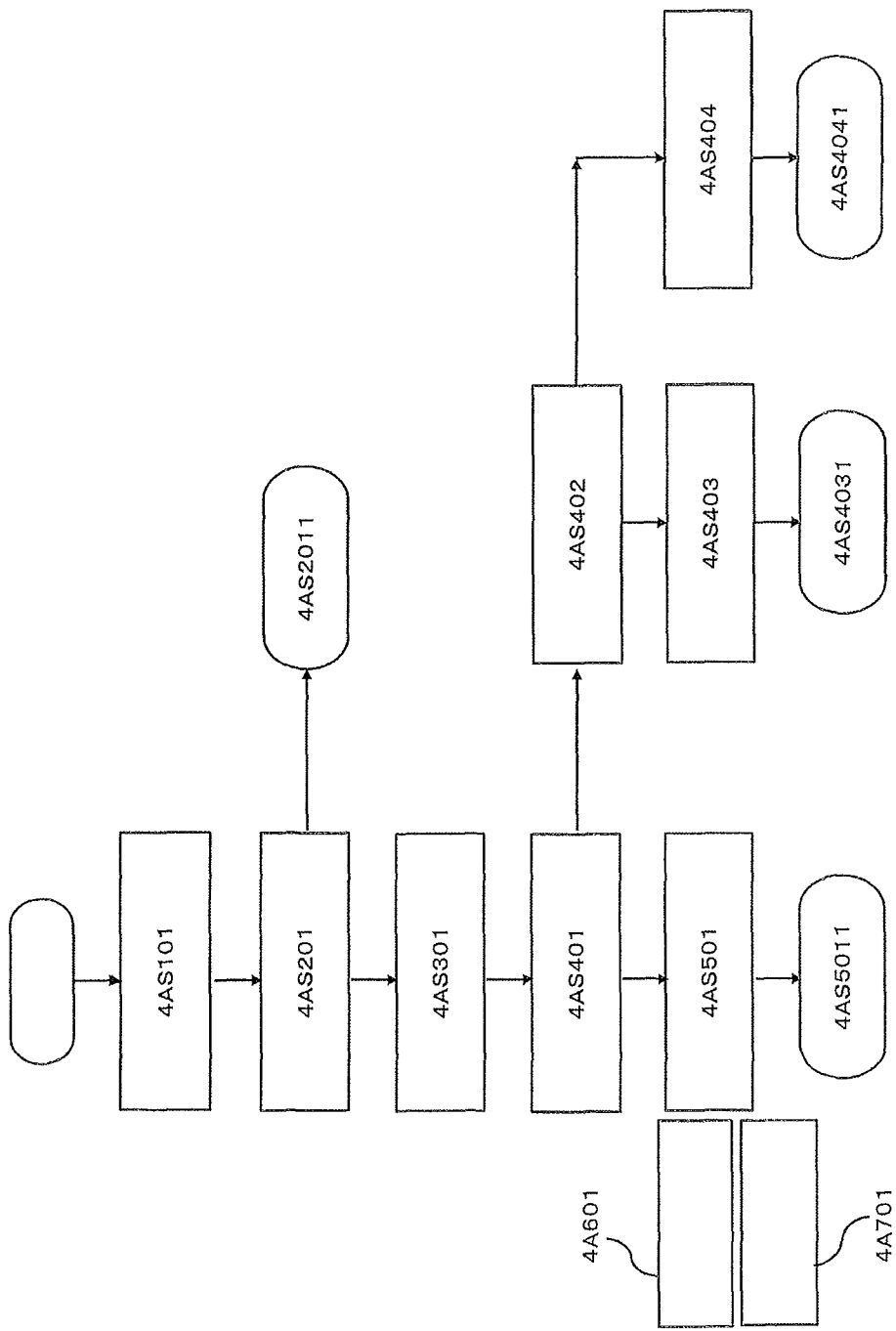
FIG. 4A is a conceptual diagram of vectors for the present program according to one embodiment of the present invention.
Figure 5:
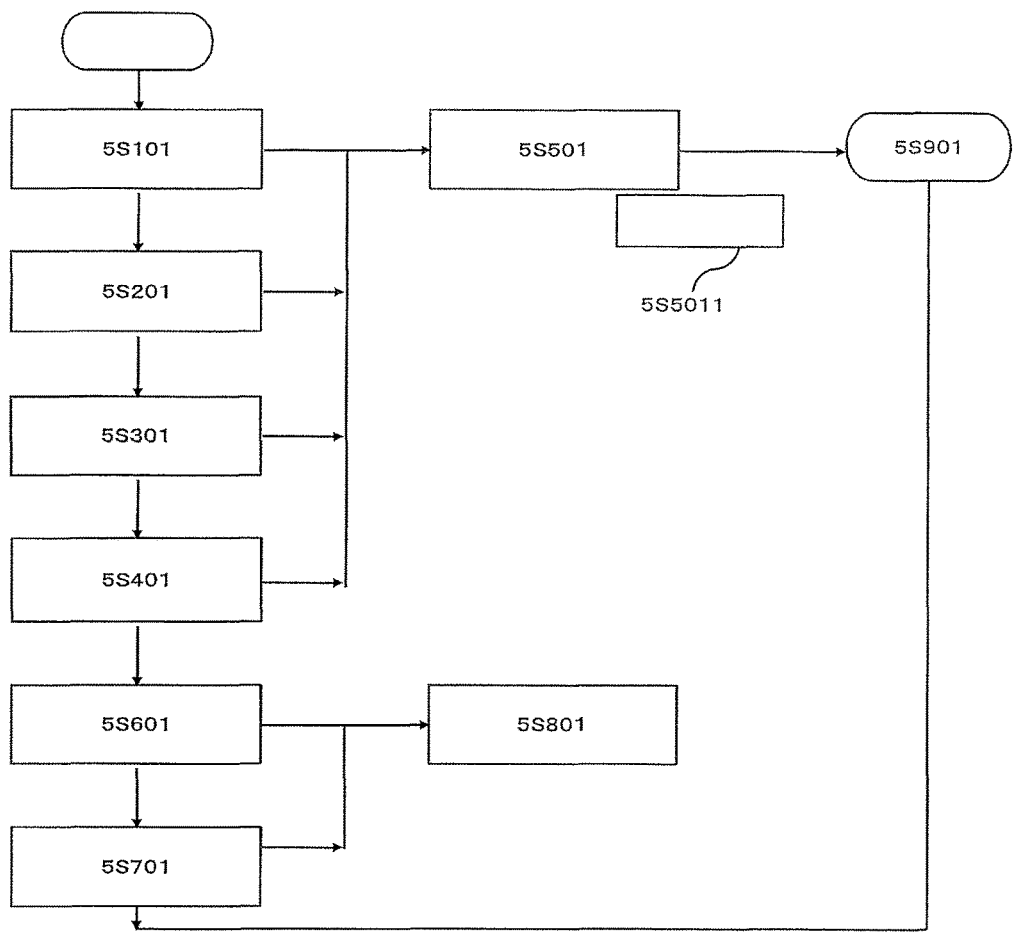
FIG. 5 is a conceptual diagram of a virus watching algorithm according to one embodiment of the present invention.

The legitimate fourth area is the solution of the vector. The fifth rule of vector determines presence or absence of possibility of establishing the legitimate fourth area. The method of evaluation is described later. The sixth rule of vector declares that the possibility of establishing the legitimate fourth area is on the same Coordinate Period (see the section of Coordinate Period). The seventh rule of vector declares that the possibility of establishing the legitimate fourth area is absent in the near future. The first rule of vector evaluates whether to finish the operation of itself or advance to the second rule, using its legitimacy. The derivation of the structure of the vector is described in the book (program revolution for disabling computer virus) written by the present inventor. As shown in FIGS. 4A and 5, the vector of the program according to the present invention is established by the virus watching algorithm and adding the second flag as described above.

(Classification of Vector)

The vectors can be classified into the following three types.

(1) A vector with a solution that is the subject of instructive statement (2) A vector with a solution that is the achievement of the function determined by at least one instructive statement (3) A vector with a solution that is the achievement of the control of the Scenario Function The above (1) is collectively called the Subject Vector, and (2) is collectively called the L4 Control Vector, and (3) is collectively called the Control Vector.

(Types of Vector)

FIG. 2 (types of vectors) is referred to. As shown in the diagram, the types of vectors are 12 types, or L4, W4, E41, E42, T4, L2, R2, T2, L3, T31, T32 and T33. L4, W4, L2, R2 and L3 are Subject Vectors. The Subject Vector subjectifies a minimal class noun. The minimal class noun belongs to the unit statement.

(Unit Statement)

Provided that instructive statements are unitized, any programming language is described with the following ten types of instructive statements. The unitizing is reinterpretation of the statement structure into an instructive statement with one function and one statement structure. Here, the unitized statement structure is called the unit statement. The types of unit statements are ten types, that is, 1. area statement, 2. comment (stationary arrangement) statement, 3. translation statement, 4. substitution statement, 5. constant value statement, 6. conditional statement, 7. input statement, 8. output statement, 9. call statement, and 10. control statement. The instructive statement ruled by the vector is the unit statement. The unit statement is ruled by the vector. The vector is accompanied by tense. Thus, the unit statement ruled by the vector is assigned tense.

The tense of the unit statement is as follows.

(1) The area statement, comment statement, translation statement, and control statement are transcendent over the tense.

(2) The tense of substitution statement, output statement, and call statement is the "present".

(3) The tense of the constant value statement, and input statement is the "past".

(4) The tense of the conditional statement is the "future".

Here, the unit statement with tense has a subject. The vector ruling the unit statement that establishes the subject is called the Subject Vector. The fourth area of the vector is an area accommodating the solution of the vector. The fourth area of the Subject Vector is also called the subject. The Scenario Function has intrinsic Control Vectors E41, E42, T4, T2, T31, T32 and T33. These are not related to the conventional program.

(Noun, Subject, and Variable Subject)

The noun is the name of the area. The subject is the content of the area. The Subject Vector is identified by assigning the subjectified noun (area name). Example: L4, noun.

The scheme of subjectifying the noun is determined by the instructive statement. Thus, according to the Subject Vector, the instructive statement having the subject is ruled. The subject of the instructive statement becomes the solution of the Subject Vector. The conditional statement has the variable subject, but does not have any subject. However, the conditional statement corresponds to the instructive statement having the subject. Consequently, the conditional statement is identified as L3, noun, and exits as the Subject Vector. However, the area of L3, noun becomes the fourth area for representing the achievement of the conditional statement by any of on and off.

Reference numerals E41, E42, T4, T2, T31, T32 and T33 denote the Control Vectors of the Scenario Function. The Control Vector is identified by assigning the type of Palette to which it belongs.

Example: the Form E41, P4 is Achieved

The L4 Control Vector is the vector that rules the function achieved by the instructive statement that has no subject. Identification is made by assigning the appearance number to the instructive statement typified by the L4 Control Vector.

(Supplementation to L4 Control Vector)

In a case where multiple instructive statements belong to the L4 Control Vector, and a case where the instructive statement represented in the Subject Vector belongs to the instructive statement, representation in the Subject Vector can be achieved. Alternatively, if the instructive statement has already been represented in the Subject Vector, at the position of the instructive statement of the L4 Control Vector, instead of the instructive statement, evaluation of the achievement of the fourth area of the instructive statement can be described. That is, representation can be made such that the fourth area is on A the second flag on A sixth flag on A seventh flag on. If this condition is not satisfied, the instructive statement is not established. That is, the L4 Control Vector is not established.

(Instructive Statement Ruled by Vector)

According to the Subject Vector, a single instructive statement that establishes a subject is ruled. That is, the substitution statement, constant value statement, call statement, and input statement are ruled by the second rule. The conditional statement is ruled by the third rule. The output statement is ruled by the fourth rule. There is no vector that rules the control statement. The area statement is not represented in the vector. Area information defined by the area statement is defined in a manner identical to that of the conventional program, and is basically placed at the head of the Synchronization Function. The translation statement is ruled by the L4 Control Vector.

(Supplementation to Control Vector)

Vector E41 ascertains the end state of the present program. Vector E42 detects the logical inconsistency. Vector T4 ascertains the condition of switching the Coordinate Function-4 to 2. Vector T2 ascertains the condition of switching the Coordinate Function-2 to 3. Vector T31 ascertains the condition of switching the Coordinate Function-3 to the own Coordinate Function-4. Vector T32 ascertains the condition of switching the Coordinate Function-3 to the own lower Coordinate Function-4. Vector T33 ascertains the condition of switching the Coordinate Function-3 to the own highest Coordinate Function-3. As shown with reference to FIG. 9 (rank structure of Scenario Function), the own lower and the highest are concepts established in the rank structure of the present program.

(Symbol of Vector)

Each numeral part of the respective vector types L4, W4, E41, E42, T4, L2, R2, T2, L3, T31, T32 and T33 represents the tense in which the vectors exist. "4" identifies the presence at the present in the tense. "2" identifies the presence in the past. "3" identifies the presence in the future. This concept is based on synchronization of all the types of tense, and is caused from the hypothesis of this research that the meaning is established.

(Supplementation to L3 Vector)

L3 is defined for each of cases of true and false. The corresponding vector is the Subject Vector. The Subject Vector controls the statement structure that has the subject. Meanwhile, L3 controls the statement structure that has no subject. Consequently, the Subject Vector corresponding to L3 reflects the own subject in L3. L3 is identified by obtaining the subject.

(Palette)

The Palette is three types of subset of vectors.
(1) {{L4}, {W4}, E41, E42, T4} are represented as the Palette-4, P4.
(2) {{L2}, {R2}, T2} are represented as the Palette-2, P2.
(3) {{L3}, T31, T32, T33} are represented as the Palette-3, P3.

The vectors installed in the Palette-4 are vectors that rule the instructive statement established at the tense "present". For example, these are the substitution statements and the output statements. The vectors installed in the Palette-2 are vectors that rule the instructive statement established at the tense "past". For example, these are the constant value statements and the input statements. The vectors installed in the Palette-3 are vectors that rule the instructive statement established at the tense "future". For example, these are conditional statements.

(Arrangement of Vectors on Palette)

In the conventional program, the order of arrangement of instructions should be predetermined before execution and thus arranged. This is because the conventional programs are established based on the logic connection-type thinking method. Meanwhile, in the Scenario Function, the order of arranging the vectors belonging to the Palette is freely selected. This is because the Scenario Function has the scheme of establishing data connection between the subjects of the vectors by repetitively executing all the vectors on the Palette, thereby determining the order of the vectors gradually. In the structure, repetitive execution establishes the data connection of the subjects and derives the scheme of meaning exceeding the flowchart that is the solution of the Scenario Function (see the section of scheme of meaning).

(Synchronization Function)

Figure 8:
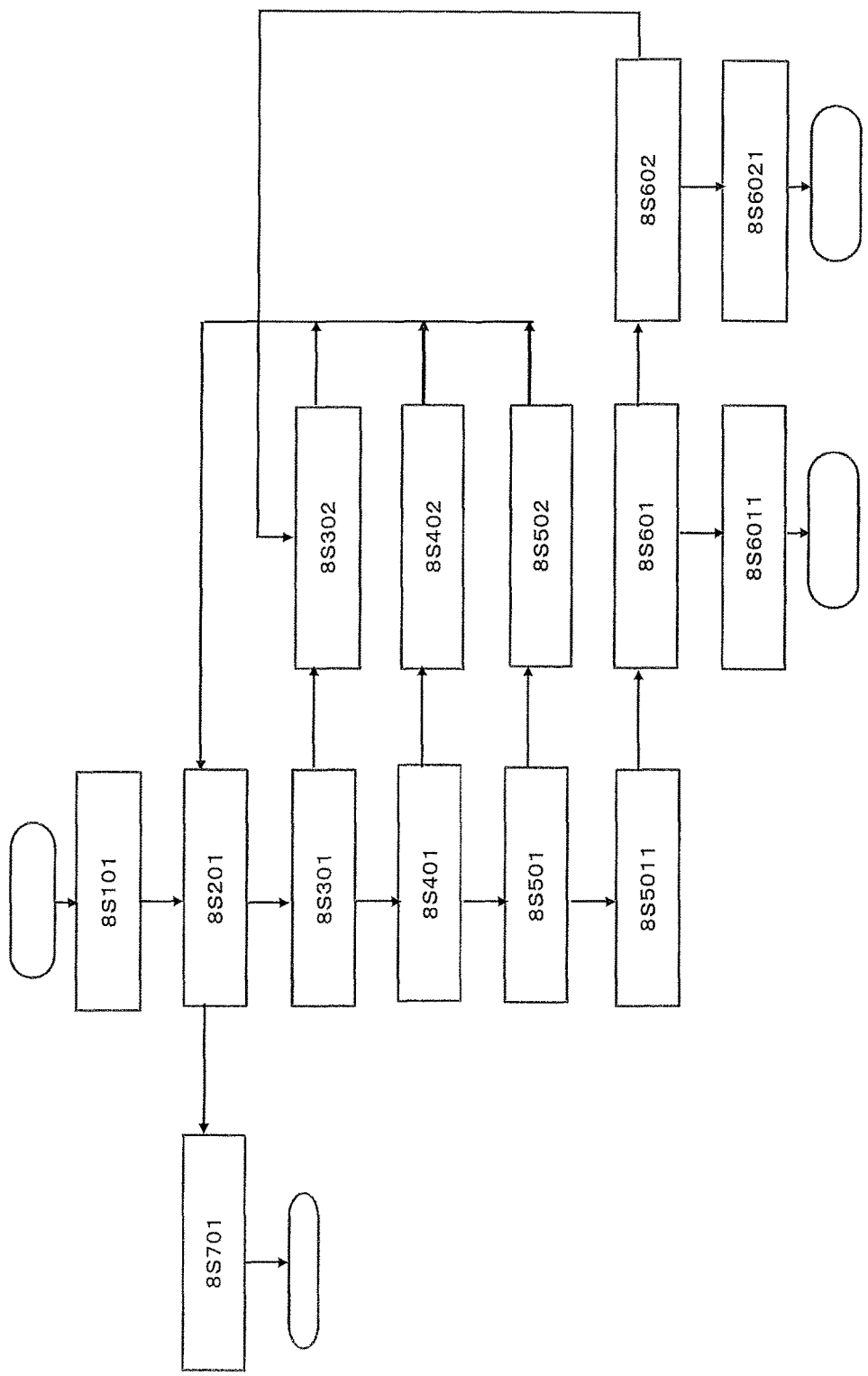
FIG. 8 is a conceptual diagram of Synchronization Functions according to one embodiment of the present invention.

FIG. 8 (basic structure of Synchronization Function (Φ0)) is referred to. In this diagram, upon start of the Synchronization Function, in a case where the number of established subjects and the number of the value of a restart counter is zero, this is the initial start. Consequently, the stack structure of the number of established subjects is initialized. In cases other than the initial start, 8S101 does not initialize this stack. As to the stack structure of the number of established subjects, see FIG. 6. In 8S201, the achievement of the Control Vector E41 is verified. Reference numeral E41 denotes a vector for telling that the present program is in the end state. When E41 is established, the Synchronization Function starts a program (SEP) of performing finish procedures. When E41 is not established, the Synchronization Function performs evaluation for starting the Coordinate Function to be ruled. In 8S301, the achievement of the Control Vector T31 is verified. In a case where T31 is established, T31 is initialized and the ruling Coordinate Function-4 is started in 8S302. In a case where T31 is not established, the achievement of the Control Vector T4 is verified in 8S401. In a case where T4 is established, T4 is initialized and the ruling Coordinate Function-2 is started in 8S402. In a case where T4 is not established, the achievement of the Control Vector T2 is verified in 8S501. In a case where T2 is established, T2 is initialized and the ruling Coordinate Function-3 is started in 8S502. In a case where T2 is not established, the achievement of the Control Vector T32 is verified in 8S601. In a case where T32 is established, T32 is initialized and the ruling Coordinate Function-4 of the present program residing immediately therebelow is started in 8S6011 and the process if finished. In a case where T32 is not established, the achievement of the Control Vector T33 is verified in 8S603. In a case where T33 is established, T33 is initialized and the ruling Coordinate Function-3 of the present program residing at its highest position in 8S6021 is started and the process is finished. In a case where T33 is not established, the own Coordinate Function-4 is started in 8S603.

As shown in FIG. 8, the Scenario Function has one Synchronization Function. The Synchronization Function is the highest control logic in the Scenario Function. The Synchronization Function rules three types of Coordinate Functions. The Synchronization Function is a restart structure. The restart structure of the Synchronization Function establishes the synchronous period. The area definition statement used by the Scenario Function is placed in the Synchronization Function.

(Coordinate Function)

Figure 7:
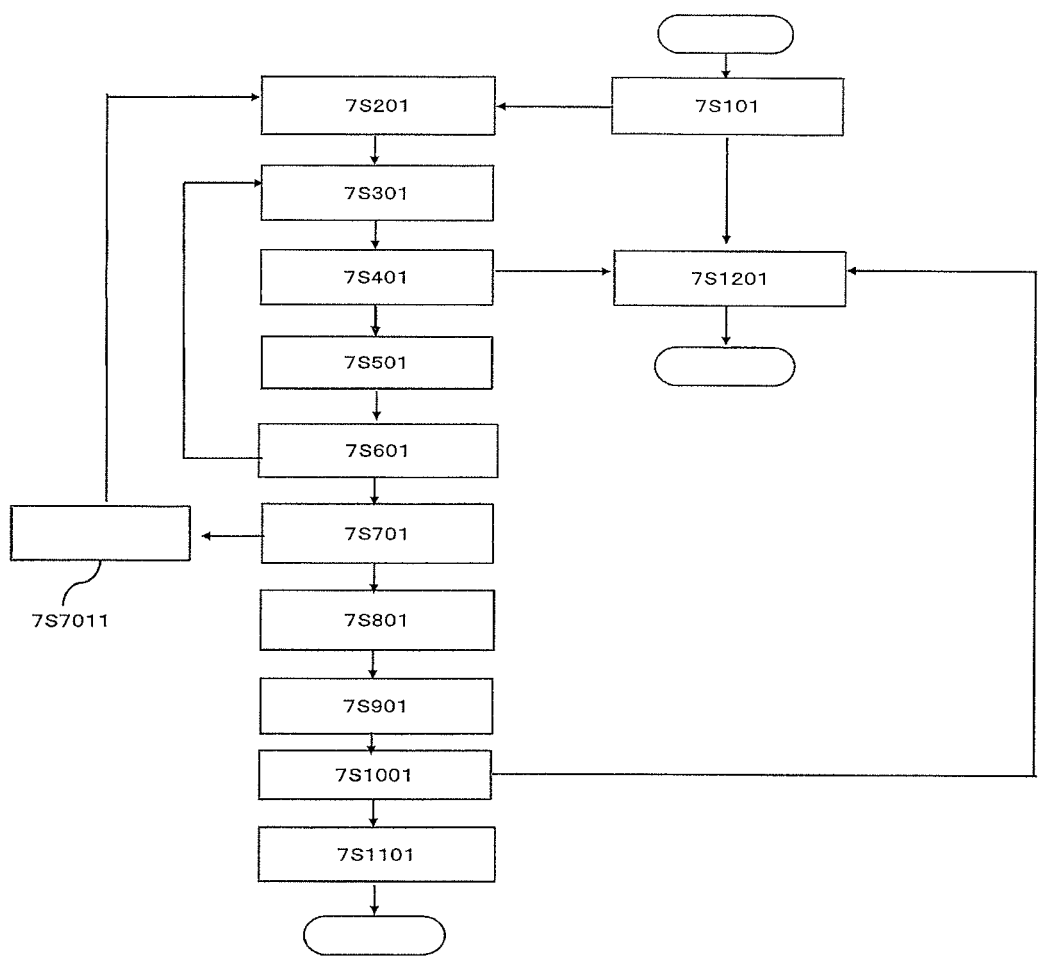
FIG. 7 is a basic conceptual diagram of three types of Coordinate Functions according to one embodiment of the present invention.

FIG. 7 (basic structure of Coordinate Function (Φ4, 2, 3)) is referred to. In this diagram, upon being started by the Synchronization Function, 7S101 verifies an instruction destroying signal, the signal being detected by OS. 7S1201 starts the program (SLP) prepared for stopping this system when the instruction destroying signal is detected. When the instruction has not been destroyed, 7S201 designates the vector with the first installation order installed on the Palette determined by the Coordinate Function. The installation order of vectors does not necessarily conform to any rule. This is a start point of the Coordinate Period. In 7S301, the designated vector is started. In 7S401, upon return of the started vector, this Coordinate Function verifies the instruction destroying signal detected by the OS. When the instruction destroying signal is detected, SLP is started. In 7S501, because of absence of destruction of the instruction, the installation order of vector is updated by one. In 7S601, it is verified whether the updated installation order exceeds the number of installed vectors. If the number of installed vectors are not exceeded, the vector with the designated order is started in 7S301. 7S701 denotes a process in a case where the number of installed vectors is exceeded. It is herein verified whether there is any vector with the sixth flag being on. If there is any vector with the sixth flag being on, this Palette does not reach a critical state. Consequently, it is required to restart the vectors installed on the Palette from the vector with the first installation order. In this case, the restart counter is updated in 7S701 and the process transitions to 7S201. In 7S701, if there is no vector with the sixth flag being on, the Palette has reached the critical state. This state indicates the end of the Coordinate Period of the Coordinate Function. In 7S801, the seventh flag is entirely turned off. This is in order not to impede the possibility of establishment of the fourth area, because the possibility is present in the next Coordinate Period. In 7S901 the stack of the number of established subjects is updated. In 7S1001, the achievement of the Control Vector E42 is verified. E42 is for detecting instruction overwriting contamination which cannot be detected by the OS. In a case of establishment, this Coordinate Function starts SLP. In a case without establishment of E42, the control of this Coordinate Function is returned to the Synchronization Function in 7S1101.

As shown in FIG. 7, the Scenario Function has three Coordinate Functions. The three Coordinate Functions (Φ4, Φ2, Φ3) are isomorphic except the ruling Palettes. The Coordinate Function rules the vectors belonging to the Palette. The Coordinate Function is a scheme of establishing the synchronization of the subjects in the Palette. The Coordinate Function is a restart structure. In the restart structure of the Coordinate Function, the Coordinate Period is established. As shown with reference to FIG. 6 (stack structure), the Coordinate Period is timing for determining the stack structure of the number of established subjects.

(Principle of Virus Solving Scheme of the Present Program)

To allow the program to solve viral contamination by itself, the program is required to include the following schemes.

(1) Scheme of detecting viral contamination during execution
(2) Scheme of disinfection
(3) Scheme of restart after disinfection In a case where the program has the restart structure, the contaminated area is disinfected by initialization. As is understood from the Scenario Function, the Scenario Function has the restart structure such as restart from the beginning according to the present program. Consequently, disinfection is achieved by initializing a contaminated area with the definition attribute. This restart structure is a scheme established by establishment of the dynamics of the Scenario Function as the data connection type. The dynamics of the conventional program is established by logic connection. Consequently, unlike the Scenario Function that establishes a structure of restart on an area-by-area basis, the dynamics cannot establish such a structure. In the present program, the viral contamination is resultantly detected as structural predicate inconsistency occurring in the present program (see vector legitimacy, and fourth area legitimacy).

Consequently, the present program can solve the virus problems without using the viral information at all (see disabling viruses). In addition, it should be noted that the virus problems cannot be solved using viral information. This is because the more the knowledge of software crisis is obtained, the more the resolution thereto becomes complicated, resultantly an unrelated programming language is delegated and solution is abandoned, and, as such, as detailed knowledge of viruses is obtained, the resolution becomes clinical and does not reach the solution. In other words, acquisition of detailed knowledge and problem solving become problems different from each other in many cases. Consequently, the idea of resolving the virus problems utilizing virus creators only complicates the situations. In other words, widespread use of programming languages intending to improve the coding rate for the sake of resolving the software crisis using the programming languages has facilitated the superficial convenience of programming languages, which cannot alleviate the software crisis but further complicates the situation; we cannot help pointing out this is the history heretofore.

The description method is ruling that places limitation on the programming language (grammar). What should be described here is that the programming language and the description method has concepts which are similar but different from each other. The ruling of this limitation is determined by the program structure. The program structure that ultimately establishes universality against many limitations by the programming language solves the program problems and virus problems. The concept of description method transcending the programming language grammar has been obtained by the present inventor's original dynamic analysis for 15 years. This concept is reflected in the Scenario Function according to the present application. With reference to the model of the present program, it can be considered that presence of a predicate sense even in the simplicity can be noticed. What demonstrates that change in program structure can achieve the solution is the Scenario Function.

Only a single type of ordinary virus has a power of destroying a computer system. Consequently, even a single virus cannot be allowed to invade the program. This is the "absolute requirement of solving virus problems". Thus, the solution to the virus problems cannot be achieved only by an idea. That is, it can be said that without finding of the principle of solving method, the virus problems cannot be solved. The subject (fourth area) variously changes during execution even though the subject is the same. Consequently, evaluation on whether the subject is contaminated is performed only in execution. Presence or absence of contamination cannot be ascertained even by observing only the subject. It cannot be mechanically evaluated whether the subject is contaminated without observing the appropriateness of subject establishment process.

The vector has universal flags (sixth and seventh flags). The flags serve as the basis of the scheme of detecting the predicate inconsistency of the subject. The two types of flags and a third one, which is a second flag, added thereto allow the appropriateness of establishment process of the subject to be evaluated according to the presence or absence of the fourth area (subject) and the relative relationship of the three types of flags. This scheme is the principle of the scheme of the present program that mechanically evaluates the viral contamination of the subject. The second flag is thus added to the Scenario Function in order to ascertain the timing of the subject. If the timing of establishment of the subject is unknown, the contamination of the subject cannot be detected. The scheme of ascertaining the appropriateness of the establishment process of the subject according to the program of the present invention is established by the third rule of the vector.

(Axiom of Solving Virus Problem)

According to the present invention, the virus problems are consistently ascertained as a phenomenon that is caused by the incompleteness of dynamics of the conventional program. The present invention is based on recognition that the incompleteness of the definition of source code of the logic connection-type program which has been to be reformed at the stage of the software crisis in 1973 and the incompleteness of the dynamics thereof has increased the convenience of computer systems without actual improvement in the state as it has been, and consequently, the virus problems occur with the programs serving as a hotbed. It is apparent that the method that is taken by current products against viruses and places a defensive barrier for blocking occurrence of a viral symptom before a medium to be invaded basically has a fault and dose not solve the virus problems; this method thus has a problem.

As described above, there are theoretically virus invasion windows as many as the number of instructive statements. Consequently, the idea of blocking viruses before the media to be invaded can only be described to be unimaginable as an attitude of seriously solving the problems. In other words, we cannot help pointing out that the business method in this field heretofore that gains the source of business without solving the problems is also applied to the virus problems without regret. The present application opposite to such a method can make an axiom to simplify and solve the virus problems, which is described later.

(1) Viral contamination is detected as the predicate inconsistency of an invaded medium.

(2) Solving the contamination of the invaded medium eliminates the virus problems.

(Supplementation to Axiom)

According to the axiom 1, in order to solve the virus problems, it is required to allow the virus to invade the medium to be invaded, and contaminate the invaded medium. The axiom 1 means that the viral invasion method can be eliminated from the virus problems. The predicate inconsistency occurring in the invaded medium is determined according to the structure of the invaded medium. Thus, the predicate inconsistency of the invaded medium can be detected irrespective of the virus. Meanwhile, the axiom 2 is a necessary consequence from the scheme of the virus. The disabling viruses make the presence of viruses meaningless.

(Structure of the Present Program)

The vector for the present program is replaced from that in FIG. 3 to that in FIG. 4A. In FIG. 4A, the virus watching algorithm (FIG. 5) is used. In FIG. 4A, 4AS101 denotes the virus watching algorithm (VWA) attached to the vector. 4AS201 denotes the first rule of vector, where the reasonableness of the vector is evaluated. As to the evaluation of the reasonableness of the vector, see FIG. 4B (described later). 4AS2011 denotes the exit of the first rule. 4AS301 denotes the second rule of vector, where the second flag is set to on. The instructive statement ruled by the second rule is placed here. 4AS401 denotes the third rule of vector, where the reasonableness of the fourth area is evaluated.

4AS501 denotes the fourth rule, where if the evaluation of the third rule is affirmative, the subject obtained by the instructive statement ruled by the vector is moved to the fourth area together with the restart counter at the time of obtainment. The sixth flag is turned off. 4AS5011 denotes the exit of the fourth rule. 4AS402 denotes the fifth rule of the vector. When the evaluation of the third rule is negative, the presence or absence of possibility of affirmative evaluation of the fifth rule is determined. The stack structure of the number of established subjects is used for this evaluation. Here, the fourth area is initialized. 4AS403 denotes the sixth rule, where if there is a possibility in the fifth rule, the sixth flag is turned on and the second flag is turned off here in order to request the vector restart. 4AS4031 denotes the exit of the sixth rule. 4AS404 denotes the seventh rule, where if there is no possibility in the fifth rule, the seventh flag is turned on and the second flag is turned off here in order to stop the vector restart. 4AS4041 denotes the exit of the seventh rule. If the supplementary measures such as a service message is required, the sixth and seventh rules can adopt the measures. In 4AS601, one is added to the counter of the number of established subjects. In 4AS701, the value of the restart counter is held.

FIG. 4B shows the relative relationship of the fourth area, the second flag, the sixth flag and the seventh flag for ascertaining the legitimacy of vectors used by the present program. This relativity is obtained as the state of the vector at the exits 2, 3 and 4 of the vector.

FIG. 5 is a conceptual diagram of a virus watching algorithm according to one embodiment of the present invention. In this diagram, in 5S101, the presence or absence of contamination of the second flag is observed. In 5S201, the presence or absence of contamination of the sixth flag is observed. In 5S301, the presence or absence of contamination of the seventh flag is observed. In 5S401, the presence or absence of contamination of the fourth area is observed. In 5S501, if any one of the above items is contaminated, the vector is initialized. 5S5011 decrements the counter of the number of established subjects by one. 5S901 denotes the end exit of this VWA. In 5S601, the presence or absence of the contamination of the counter of the number of established subjects is observed. In 5S701, the presence or absence of the contamination of the restart counter is observed. In 5S801, because of the contamination incapable of being addressed by vector initialization, the program (SLP) prepared to stop this system is started.

The three types of Coordinate Functions are basically those in FIG. 7. Here, a single counter of the number of established subjects is provided for the present program. The present program conforms to the definitive expression of Scenario Function. It is apparent that the definition structure of the present program is different from the conventional program. Consequently, the present invention results in the precise structure theory of the program.

(Supplementation to Vector Legitimacy)

In consideration of restart of the vector by the Coordinate Function, the requirements for satisfying the vector legitimacy are that the vector has passed any of the own exits 2, 3 and 4 and that the vector is in the state of being initialized by the virus watching algorithm (VWA). Incidentally, the state of the exit 3 is the same as the exit state of VWA (see FIGS. 3 and 5). The vector legitimacy serves as the evaluation condition at the first rule on whether to advance to the second rule. This condition is defined as follows.

(Relativity of Fourth Area and Three Types of Flags)

Universal relativity is established between the fourth area and the three types of flags (see FIG. 4B). The vector legitimacy is this relativity.

(1) The state of the vector initialized by VWA is the same as the state of the exit 3.

In this case, the vector advances to the second rule.

(2) The state of the vector at the exit 2 is (fourth area on A second flag on A sixth flag off A seventh flag off).

In this state, the vector restarted through VWA is returned by the first rule.

(3) The state of the vector at the exit 3 is (fourth area off A second flag off A sixth flag on A seventh flag off).

In this state, the vector restarted through VWA advances to the second rule.

(4) The state of the vector at the exit 4 is (fourth area off A second flag off A sixth flag off A seventh flag on).

In this state, the vector restarted through VWA is returned by the first rule.

Because the vector legitimacy and the fourth area legitimacy have different meaning, it should be noted that the legitimacies should not be confused. The fourth area legitimacy is used for the third rule. The vector legitimacy is used for the first rule.

(Structure of Vector Supporting Viral Contamination)

The vector observes, through the own third rule, whether the subjects of all the variable subjects pertaining to the establishment of the own fourth area are established without contamination, in order to establish the own fourth area legitimately. If any one of the subjects of the variable subjects is contaminated, establishment of the own fourth area is given up and advances to the fifth rule. The fifth rule verifies the possibility of establishment of the legitimate subject in the near future by a special method that uses change in the number of established subjects. See the section on the stack of the number of established subjects.

(Solution to Contamination in Fourth Area)

In case the flag is contaminated, VWA initializes the vector, and performs restart using the restart scheme of the present program so as to obtain the legitimate fourth area again. However, what is described here is a problem in that the fourth area is overwriting-contaminated by the virus even though the relativity of the flag without contamination suggests that the fourth area is legitimate, that is, even though the second flag on ˆ sixth flag off ˆ seventh flag off. The fourth area is established the number of restarts kn. The fourth area is held as the fourth area kn according to the fourth rule. Every time of execution, VWA takes XOR between the fourth area kn and the fourth area at the execution. If the areas are the same, the fourth area kn is not contaminated. If the areas are not the same, the fourth area is contaminated (see FIG. 5). In the case of contamination, the vector is initialized by this VWA. Because of this measure, (1) The restart counter updated by the Coordinate Function is provided.

(2) The number of restart counter is one for the present program.

(3) The provided position is immediately after a position where criticality evaluation of the Coordinate Function becomes NO.

(4) The vector adds the restart counter Kn at the time of establishment of the fourth area and holds the fourth area.

(5) The restart counter is placed in privileged areas which are not contaminated in a manner analogous to that of the number of established subjects and the stack of the number of established subjects.

(Privileged Areas)

As to the restart counter, the number of established subjects, and the stack structure, presence or absence of contamination is observed using the constant of XOR so as to allow observation through the scheme of observing contamination of the three types of flags of the program model of VWA (FIG. 5). According to the present invention, such areas (the three types of flags, the restart counter, the number of established subjects, and the stack structure) are represented as the privileged areas. The entire contamination of the privileged areas is observed by VWA using the XOR constant in a manner analogous to that of the observation of contamination of the three types of flags. An example of the XOR constant therefor is described below.

(1) The on and off of the flag area is indicated at the highest one of four (binary) digits.

In case of contamination of the flag area, not only the highest digit but also the lower three digits are also contaminated. Consequently, lower three digits of the four digits being zero are established as an XOR constant in this case.

(2) In the restart counter, the count value is indicated from the highest digit of the four digits.

In case of contamination of the restart counter, the lowest digit of the four digits is also contaminated. Consequently, the lowest one digit of the four digits being zero is established as an XOR constant in this case.

(3) In the counter of the number of established subjects, the count value is indicated from the highest digit of the four digits.

In case of contamination of the counter of the number of established subjects, the lowest digit of the four digits is also contaminated. Consequently, the lowest one digit of the four digits being zero is established as an XOR constant in this case.

(4) In case of contamination of the stack of the number of established subjects, the case is the same as that of the destruction of an instruction according to the characteristics. This state cannot be detected by the XOR constant. Consequently, this state is detected by E42.

According to the scheme, the strict and profound scheme of the present program detects contamination, and automatically performs recovery. Viral contamination that destroys such a scheme of the present program cannot be that other than the destruction of an instruction.

(Place of on and Off of Three Types of Flags)

The initial value of the second flag is off.
The second flag is turned off by the sixth rule.
The second flag is turned off by the seventh rule.
The second flag is turned off by the Coordinate Function.
The initial value of the sixth flag is on.
The sixth flag is turned on by the sixth rule.
The sixth flag is turned off by the fourth rule.
The sixth flag is turned off by the fifth rule.
The initial value of the seventh flag is off.
The seventh flag is turned on by the seventh rule.
The seventh flag is turned off by the Coordinate Function.

(Virus Watching Algorithm (VWA))

The virus watching algorithm observes the contamination of three types of flags, and in case of contamination, this algorithm determines that the fourth area is also contaminated. In this case, the vector is initialized (see FIG. 5). The virus watching algorithm (FIG. 5) is placed at the head of the entire vector as shown in FIG. 4A. It is determined that the situation where three types of flags are not contaminated but the fourth area is contaminated cannot occur. If this situation occurs, logical inconsistency is caused. This case is covered by E42.

(Addition of Dynamics of Program)

The program dynamic analysis method of Laval University, which was an authority of the dynamic analysis method in 2000s, is a method of adopting the establishment trajectory of nouns (variable names) belonging to the program. According to this method, the establishment trajectory of the conventional program forms a spaghetti structure. Meanwhile, analysis of the Scenario Function according to the present application verifies that the establishment trajectory of nouns forms a comb form but does not form so-called spaghetti structure, and visually shows the problem structure of the conventional software (see FIG. 1E). That is, use of the dynamic analysis adopting the trajectory of subjects allows the conventional program and the Scenario Function to result in the structure of the scheme of meaning (FIG. 12) denoted by the present invention. This can be considered to be one of proofs that the Scenario Function is at the highest rank as the program description method. The usage of the scheme of meaning is more effective as the program dynamic analysis tool of the conventional program than the Scenario Function.

(Dynamics of the Present Program)

The dynamics of the present program in the computer is a scheme for establishing FIG. 12 through data connection. The dynamics of conventional program in the computer is a scheme for establishing FIG. 12 through logic connection. The virus invades the present program in operation. The state of the present program in operation is a state where the present program is creating the solution of the present program, for example, FIG. 12 using a computer. As the virus selects the present program A as a medium to be invaded from among the multiple programs for example, the virus invades the present program A. In view of the present program A, viral invasion is a situation where the program is contaminated irrationally during operation. In this case, the number of contaminated instructive statements is unknown to anyone. Thus, according to the present invention, the presence or absence of contamination in every instruction ruled by the vector is observed by the vector at the time of execution. The present program includes the important flags, and counter of the number of established subjects, and its stack. There is however a possibility that these elements are also contaminated. In case of contamination, the present program is resultantly detected by E42 that detects contamination of the instructions which does not reach destruction of an instruction.

(Appropriateness of Present Invention)

The appropriateness of the present invention can be found by associating three items, or the illustration of this Description, the attached program model, and the following problems, with each other. The problem in this case is the following four types of schemes.
(1) Scheme of performing original operation
(2) Scheme of disabling viruses
(3) Completeness of the present program
(4) Establishment of algorithm of automatically converting conventional program into the present program (Scheme of Performing Original Operation)

The three types of Coordinate Functions start the Subject Vectors mounted on the ruling Palettes, and establish the subjects. The present program has a scheme of establishing the subject as much as possible using the genealogy relationship according to the restart structure. The above description is a necessary and sufficient proof of the present program being in the original operation.

(Objects to be Contaminated in the Present Program)

The objects to be contaminated in the present program are as follows.
(1) Vectors, Coordinate Functions, and instructive statements of ruling Synchronization Functions
(2) Data area
(3) Three types of flags, counter of the number of established subjects, and stack area of counter of the number of established subjects (What is Virus Disabling)

Virus disabling is taking the following measures.
(1) Initialization of the data area
(2) Stop executing the program (Scheme of Disabling Viruses)

Fifteen universal schemes (without exception) used in the present program are listed below.
(1) Structure of vector
(2) Three types of flags
(3) VWA and its position
(4) Scheme of restart structure
(5) Scheme of Coordinate Period
(6) Scheme of synchronization structure
(7) Scheme of ascertaining the legitimacy of vector used in the first rule of vector
(8) Scheme of ascertaining the legitimacy of fourth area used in the third rule of vector
(9) Scheme of detecting contamination of the fourth area used by VWA
(10) Scheme of EOR constant for detecting contamination of the privileged area used by VWA
(11) Scheme of detecting the logical inconsistency by E42 using the stack of the number of established subjects
(12) Scheme of ascertaining the possibility of establishing the fourth area using the stack of the number of established subjects according to the fifth rule
(13) Position for counting the number of established subjects for the stack of the number of established subjects
(14) Scheme of ascertaining the criticality of the Palette
(15) Scheme of ascertaining the program criticality (Completeness of the Present Program)

The scheme of the genealogy of establishing the maximum number of legitimate subjects is a proof of the completeness of the original operation of the present program. Incidentally, proving the completeness of the original operation of the conventional program negates the need to test the program.

(Scheme of Automatically Converting Conventional Program into the Present Program)

Figure 9:
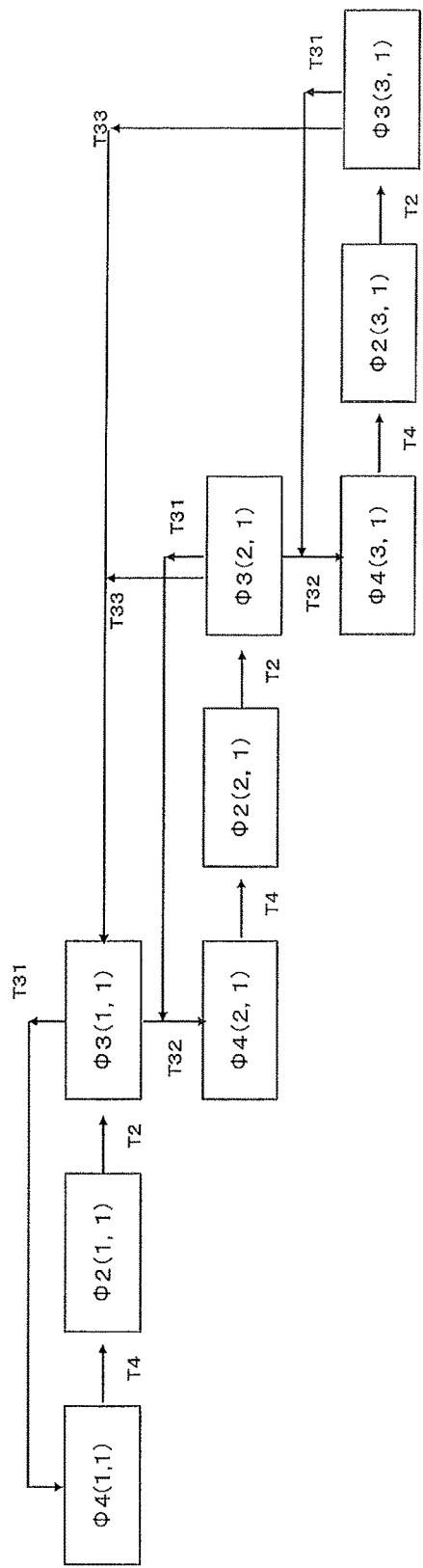
FIG. 9 is a conceptual diagram of three types of rank structures of the present program according to one embodiment of the present invention.

The algorithm of generating the LYEE Space from the conventional program (FIGS. 11A and 11B) and the algorithm of generating the present program from the LYEE Space (FIG. 1B) allow the conventional program to be automatically converted into the present program. The program structure of the present invention including multiple Scenario Functions is called a rank structure. FIG. 9 is a diagram showing an example of a diagram of a rank structure of Scenario Functions. In this diagram, Φ4(1, 1) denotes a Coordinate Function-4 of a rank structure (1, 1), Φ2(1, 1) denotes a Coordinate Function-2 of a rank structure (1, 1), and Φ3(1, 1) denotes a Coordinate Function-3 of a rank structure (1, 1). (X, Y) of the rank structure is the identifier of the present program constituting the rank structure. The Control Vectors T4, 2 and 31 play a role of connecting the Coordinate Functions 4, 2 and 3 of the present program at the same rank. The Control Vectors T32 and 33 play roles of connecting the Coordinate Functions at different ranks. The Scenario Functions with the rank structure are connected by the vectors T32 and T33. The conventional program is required to be made up of multiple programs theoretically and in actuality. Meanwhile, the Scenario Function can be theoretically made up of only a single Scenario Function. This is because as to the Scenario Function, the program required to constitute the system can be supported by the vectors.

The rank structure is provided because of reasons due to the problem on system operational management. Since the conventional program is the logic connection type, the logic corresponding to the Coordinate Function and Synchronization Function is not established. Consequently, the system requires multiple programs. The Coordinate Functions and the Synchronization Functions are universal. Consequently, the Scenario Function is established irrespective of the amount of vectors. There is no reason that the Scenario Function is divided into multiple pieces. Discussion can be made while the Scenario Function is replaced with the present program.

The program at a position in the rank structure of the programs to which subjects belonging to the program belong is described. FIG. 13 is a diagram for showing the program at a position in the rank structure of the programs to which subjects belonging to the program belong according to one embodiment of the present invention. This diagram shows the variable subjects of the subject A(1, 1) belonging to the rank (1, 1), for example, the program with a certain rank structure to which the subjects B and C belong. This example shows that the subjects of the variable subjects B and C belong to the same rank structure. The subjects of the variable subjects B and C are B and C.

(Relationship Between Logic Connection-Type Program and Scenario Function)

As shown in FIG. 1B, the logic connection-type program can be automatically converted into the Scenario Function of the present invention by a dedicated tool.

(Subject and Variable Subject)

As to the Scenario Function, an instruction is an operation for obtaining a subject. For example, A, B and C in an instruction "A=B+C" are nouns, A is a subject, and B and C are variable subjects. The variable subjects B and C become a subject B and a subject C at another place in the Scenario Function. Discussion can be made while the Scenario Function is replaced with the present program.

(Basic Characteristics of the Present Program that Solves Virus Problems)

As apparent in the program dynamic analysis by Laval University, no universality can be found in the (so-called) spaghetti situation of the definition and dynamics of the conventional program. On the other hand, the dynamics of the Scenario Function is the data connection type, while the method of describing the vectors, Coordinate Functions and the Synchronization Functions, which are configuration elements of the Scenario Function, is the logic connection type. Universality, which is duplicability, is established in the definition of the source code. This is because universality is established in definition of the vectors. As apparent in the program dynamic analysis by Laval University, the data connection establishes universality with a comb form scene. The present program can solve the virus problems as predicate inconsistency, because universality which can be found in the definition of source code, and its dynamics is established. The Synchronization Functions and the Coordinate Functions according to the present invention do not have intrinsic data areas. In the present application, what has an intrinsic data area is only the vector. Consequently, when the vector solves contamination in the data area, the Synchronization Function and the Coordinate Function are not affected. The vector does not define the function in a manner analogous to that of a conventional partial program. The scheme of determining the fourth area (subject) is only defined. As a result, the Coordinate Function results in a scheme of obtaining the fourth area to the criticality, and the Synchronization Function results in a scheme of synchronizing the obtained fourth area. Various functions required for the conventional concept are not required at all for the Scenario Function. As a result, the Scenario Function is much more monotonous than the conventional program in an unrecognizable manner. The scheme of detecting and solving viral contamination is established because of this monotonousness.

(Meaning of Restart Structure)

The restart structure of the Scenario Function is for establishing the subjects belonging to the Palette and genealogization of the subjects to the possible limit. That is, the structure is the ultimate structure of the extensive scheme of pursuing the scheme of meaning to the possible limit. This restart structure is a scheme which A. vector, B. three types of Coordinate Functions, and C. one Synchronization Function commonly has. The vector has a restart structure of operating itself to the possible limit (criticality) in order to establish its fourth area (subject). The Coordinate Function has a restart structure of operating to the possible limit in order to genealogize the fourth area (subject) of the vector among the ruling Palettes and establish fourth areas as many as possible.

In the relationship between the three types of Palettes, the Synchronization Function has a restart structure of operating the Synchronization Function to the possible limit in order to establish the fourth areas (subjects) of the vectors as many as possible. All the schemes of these restart structures are controlled by A. fourth areas of vectors, B. three types of flags of vectors, C. five types of T-vectors (T4, T2, T31, T32, T33), and D. two types of E-vectors (E41, E42). The present invention avoids the problem of complexity that is a weak point inevitably caused by the conventional program, by means of the intrinsic perspective of the program and the restart structure of the program obtained based on the perspective, which serve as the Scenario Function changing the complexity into a simple structure. The present program is established as a program structure of solving the virus problems based on the Scenario Function.

(Meaning of Synchronization Structure)

The present invention has found out that what we regard as the problem is an asynchronous situation, through the conventional program dynamic analysis, and the solution to the problem is regarded as procedures of changing the situation into the synchronization structure. The dynamics of the Scenario Function is established by data connection, while the dynamics of the conventional program is established by logic connection. These each mean a solution. The Scenario Function is a scheme of establishing the synchronization structure using a computer. However, the conventional program has already determined the way of solution at the stage of defining the source code. This is the cause of complexing the dynamics of the conventional program to the spaghetti structure. The scheme of meaning shown in FIG. 12 is the ideal structure of the solution. In the conventional programming world, no algorithm for establishing the scheme of the meaning has been found. It can be considered that this is because it is impossible to derive the synchronization structure from the asynchronous situation of program. Incidentally, the synchronization structure is an algorithm of obtaining the scheme of meaning of the program, and is the first discovery in the world.

(Supplementation to Synchronization Structure)

The research of the present invention supposes that the meaning is established by a scheme of synchronizing the tense (present, past, and future). The scheme, that is, the scheme of obtaining a solution successfully results in the Scenario Function. In addition, the conventional program does not have the concept of solution. Thus, the conventional program does not have the concept of the synchronization structure itself. This is a fault which the conventional program has completely unnoticed. In the Scenario Function, the time of establishing synchronization of all the types of tense, that is, the timing of establishing meaning scheme, is represented as synchronization period. The synchronization period can be seen on the Synchronization Function. In the Scenario Function, 12 types of vectors appear. These types are classified according to three types of tense. The Palette is a container for accommodating the vectors classified according to tense. Thus, the number of types of Palettes is three. The three types of Palettes are ruled by intrinsic three types of Coordinate Functions, respectively. The Coordinate Function-4 is a model of an operation of synchronizing the present tense. The Coordinate Function-2 is a model of an operation of synchronizing the past tense. The Coordinate Function-3 is a model of an operation of synchronizing the future tense. The Synchronization Function plays a role of ruling the types of synchronization.

(Criticality of Palette)

The Coordinate Function-4 starts all the vectors on the ruling Palette-4, and verifies the presence or absence of the vector with the sixth flag being on among the vectors belonging to the Palette-4 every time the start is finished. With any vector having the flag being on, the Coordinate Function-4 restarts all the vectors on the Palette-4 from the beginning. The restart is repeated until the vector with the sixth flag being on is absent among the vectors belonging to the Coordinate Function-4. In other words, the repetition is made until the fourth area of every vector of the Palette-4 is on and the seventh flag is on in a satisfactory manner. In the present invention, this satisfactory state is called the criticality of the Palette-4. The period from the first start of the Coordinate Function-4 to the critical state of the Palette-4 being reached is the Coordinate Period of the Coordinate Function-4.

The Coordinate Period is established also in the Coordinate Function-2 and the Coordinate Functions-3 in the same manner. The Coordinate Period is one mode of the synchronization structure. The Coordinate Period of the Coordinate Function-4 is the timing when the stack of the number of established subjects in the present program is created and updated. The stack of the number of established subjects determined according to the time is used in the fifth rule of all the vectors. That is, a future condition for evaluating whether the fourth area that is the solution of the vector is established in the future is ascertained by the stack structure according to the number of established subjects at the end point of the Coordinate Period of the Coordinate Function-4 and its timing. This scheme cannot be obtained by the concept of the conventional program.

(Scheme for Establishing Genealogy for Subject)

The scheme of meaning of FIG. 12 is a diagram genealogizing the subject. Everyone can understand the genealogy by looking at the diagram. However, without looking at this, the entire content thereof cannot be understood. The Harmonization genealogy can be understood as a flowchart. However, the most part of the Metalinguistic genealogy is an unknown genealogy. You are encouraged to notice that even if the program is a conventional one, the program is established on the basis of the scheme of meaning. That is, even though we make a program without understanding the most of the logic how the program is established, we behave as if we have known the logic of the program only based on the Harmonization genealogy. The Scenario Function and the program of the present invention based on the Scenario Function assumes that what we know is only logic of subjectifying a noun; with this assumption, this program establishes a certain kind of scheme of meaning that is the solution of the program. The completeness of the program and the solution to the virus problems are established by knowing the scheme of meaning of the program.

(Scheme of Detecting Logical Inconsistency)

The present program is a scheme of adding the second flag and the virus watching algorithm to the vector of the Scenario Function and establishing the justified subject genealogy.

Unlike the conventional program, the present program has a scheme of establishing the process of the program according to the genealogy of the subject. If the genealogy is established by an uncontaminated subject, i.e., a subject against the intent of the program, the normal process cannot be achieved. Consequently, the present program has a scheme of establishing the genealogy with an uncontaminated subject, i.e., a legitimate subject. That is, in the virus watching algorithm, and the first rule and the third rule of the vector, logic is described for observation while preventing the contaminated subject from affecting the genealogy. Consequently, if any contaminated subject affects the genealogy, inconsistency occurs in the description. This inconsistency can be detected as description against the logic. In other words, the scheme of the present program detects the viral contamination on a subject-by-subject basis, thereby allowing the contamination to be completely detected. This scheme has been obtained through the research for obtaining a complete scheme of a program. That is, this has been obtained irrespective of viruses. Consequently, the present program can detect viral contamination without using virus tags (viral information), and disable the viruses. The virus problems are problems which cannot be solved based on knowledge on viruses. The virus watching algorithm detects contamination, and initializes the contaminated vector. The first rule of the vector observes vector legitimacy through the relativity between the fourth area and three types of flags. The third rule of the vector observes the legitimacy of the fourth area (subject) in the relationship of the justified subject genealogy. In view of the present program, the virus cannot approach the present program while watching the present program with sidelong glances, and cannot exist without behaving as if sleeping.

(Counting Subjects)

When the legitimate subject (fourth area) is established, the number of established subjects is counted by adding one to the counter of the number of established subjects by the fourth rule of the vector. If the virus watching algorithm evaluates that the subject (fourth area) is not legitimate, this virus watching algorithm initializes the vector. At this time, the virus watching algorithm decrements the counter of the number of established subjects by one.

(Stack Structure)

The stack structure diagram of FIG. 6 is referred to. This diagram is a diagram showing a stack structure of the number of established subjects (having the same meaning as the number of established fourth area) used by the present program according to one embodiment of the present invention. The single stack is provided for the present program. This stack is generated using the Coordinate Period of the Coordinate Function-4. There is no need of generation in the Coordinate Function-2 and the Coordinate Function-3. This stack is used in the vector.

The usage is described as follows.

(1) Use in Fifth Rule of Vector

The fifth rule of the vector is a rule for determining presence or absence of possibility of establishment of the fourth area of this vector on the same Coordinate Period. The stack of the number of established subjects is used for this evaluation. That is, if NS1>NS5, the own fourth area can be determined that there is a possibility of establishment on the same Coordinate Period.

(2) Use in Vector E42

Reference numeral E42 denotes a vector for detecting destruction of an instruction which cannot be detected by OS. E42 detects the destruction of an instruction as the logical inconsistency of the number of established subjects, that is, NS1<NS5. If the present program is normal, the relationship between NS1 and NS5 is necessarily NS1>NS5. However, in case a symptom occurs in the situation, the relationship in the present program reaches NS1<NS5.

The cause is any of the following items.
1) Error of vector
2) Contamination of instruction code which has not reached destruction of the instruction There is no error 1) described above at the time of execution. Consequently, the cause is the above 2).

3) Use in Vector E41

Reference numeral E41 denotes a vector for ascertaining a state where the number of established subjects of the present program reaches the criticality (normal end state of the present program). E41 ascertains this situation as NS1=NS5.

(4) Use in Vectors T4, T2 and T3

The limit state of subject established in each Palette is represented as the criticality of the Palette. The criticality of the Palette-4 serves as the establishment condition of T4. The criticality of the Palette-2 serves as the establishment condition of T2. The criticality of the Palette-3 serves as one of the two establishment conditions of T31, T32 and T33. Another condition is the residing position of the subject represented by the subject distribution table.

(1) When the conventional program is contaminated, the contamination affects not only the program but also the system to which the program belongs.
(2) Replacement of the conventional program with the program of the present invention solves the virus problems.
(3) The conventional program can be automatically converted into the present program by the dedicated tool, as can be understood with FIG. 1B.
(4) A classroom lecture for about 60 hours is required for an engineer of the conventional program to create the present program efficiently.

(Reason of Presence of Logic Connection-Type Program in the Present Program)

A program model pertaining to the present program is attached to this Description. In the present program, programs having data areas are only vectors according to the present application. The data area is a target to be contaminated. Thus, the vector requires a scheme for disabling contamination in the data area. Consequently, in the present invention, the second flag and VWA are added to the vector. It should be noted that the programs other than the vectors in the present invention, that is, the VWA, Coordinate Function, and Synchronization Function have no intrinsic data area. With respect to this point, these programs do not cause the contamination problems of data areas. That is, the contamination occurring therein is only the destruction of an instruction. This is an advantageous effect of the vector, and the characteristics of the present program. Thus, the VWA, Coordinate Function, and Synchronization Function are allowed to be left as the logic connection-type programs. In a case where the program has no intrinsic data area, the program can be shared irrespective of the creator of the program even if the duplicability is not established. That is, the VWA, Coordinate Function, and Synchronization Function can be shared irrespective of the creator even if the duplicability is not established. This is also one type of duplicability.

(Model of the Present Program)

The example of the algorithm of the present program (hereinafter called "program model") is attached for the sake of understanding of the contents of this Description, and the structure represented in a program, that is, FIGS. 3, 4A, 5, 7 and 8. Thus, for the sake of avoiding confusion of understanding due to complexity, not all the contents of this Description are modeled. The degree of modeling is kept within an extent sufficient as disclosure of the technical thought of the invention of the present application. Even a creator of the conventional programmer can create the program based on the present invention using the illustration of this Description and the program model. The present program model serves as specifications that suggest the tool of automating the coding of the present program (see FIG. 1B).

The present program is created for each programming language. The invention of present application is applicable to cases using any of a screen operation language, and DB and DC languages, among which the creator's favorite one can be used. The present program is completed by creating the vectors, Coordinate Functions and Synchronization Functions on the basis of the program model described below and combining these items according to the definitive expression of Scenario Function. If there is one combination of the coordinate and Synchronization Functions in the world, this combination can be used as it is.

(Mode of Logic Connection-Type Program of VWA(L4, A))

FIG. 5 is referred to. Next, the program model in this case is shown.

001 START.
002 Observe contamination of the second flag:
0021 Extract (2, 3, 4)-th digits of the second flag are extracted.
0022 Take XOR of the (2, 3, 4)-th digits of the second flag and the corresponding flag constant (0, 0, 0).
00221 If ZERO, the second flag is not contaminated. GO TO Observation of the sixth flag.
00222 If NOT ZERO, the second flag is contaminated. GO TO Initialization of L4, A.
003 Observe contamination of the sixth flag:
0031 Extract (2, 3, 4)-th digits of the sixth flag are extracted.
0032 Take XOR of the (2, 3, 4)-th digits of the sixth flag and the corresponding flag constant (0, 0, 0).
00321 If ZERO, the sixth flag is not contaminated. GO TO Observation of the seventh flag.
00322 If NOT ZERO, the sixth flag is contaminated. GO TO Initialization of L4, A.
004 Observe contamination of the seventh flag:
0041 Extract (2, 3, 4)-th digits of the seventh flag are extracted.
0042 Take XOR of the (2, 3, 4)-th digits of the seventh flag and the corresponding flag constant (0, 0, 0).

00421 If ZERO, the seventh flag is not contaminated. RETURN.
00422 If NOT ZERO, the seventh flag is contaminated. GO TO Initialization of L4, A.
005 Initialize L4, A
0051 Initialize the fourth area.
0052 Turn off the second flag.
0053 Turn on the sixth flag.
0054 Turn off the seventh flag.
006 Decrement the counter of the number of established subjects by one.
007 RETURN.

(Vector model of L4, A)

The vector instructive statement example is "A=B+C+512". The instructive statement ruled by L4, A is placed in the second rule according to the vector description method. In L4, A there is no L3, A. If L3, A is present in L4, A, legitimacy evaluation of L3, A is added to the third rule. Next, the program model in this case is shown.
001 START.
002 NOP.
003 CALL VWA(L4, A).
004 The first rule: Evaluate whether to advance to the second rule or RETURN using the legitimacy L4, A.
  see the section of vector legitimacy
005 The second rule.
0051 MOVE 1 TO the second flag
0052 A=B+C+512.
006 The third rule: Evaluate the legitimacy of A (fourth area legitimacy).
0061 Is the fourth area of L4, B is legitimate?
00611 If legitimate, GOTO 0062.
00612 If not legitimate, GOTO the fifth rule.
0062 Is the fourth area of L4, C is legitimate?
00621 If legitimate, GOTO the fourth rule.
00622 If not legitimate, GOTO the fifth rule.
007 The fourth rule.
0071 MOVE 0 TO the sixth flag of L4, A.
0072 MOVE A TO the fourth area of L4, A.
0073 ADD 1 TO the counter of the number of established subjects.
008 RETURN.
009 The fifth rule: Evaluate whether A of L4, A is established on the same Coordinate Period.
0091 MOVE 0 TO the sixth flag
0092 If (NS1=NS5), the processing advances to the seventh rule.
0093 If (NS1>NS5), the processing advances to the sixth rule.
010 the sixth rule: declare restart request for L4, A.
0101 Initialize the fourth area of L4, A.
0102 MOVE 1 TO the sixth flag.
0103 MOVE 0 TO the second flag.
0104 RETURN.
011 The seventh rule: declare stopping restart of L4, A.
0111 MOVE 1 TO the seventh flag.
0112 MOVE 0 TO the second flag.
0113 RETURN.

(Vector model of L3, D)

The vector instructive statement example is "IF X<Y (true)". The instructive statement ruled by L3, D is placed in the third rule according to the vector description method. Next, the program model in this case is shown.
001 START.
002 NOP.
003 CALL VWA(L3, D).
004 The first rule: Evaluate whether to advance to the second rule or RETURN using the legitimacy L3, D.
  see the section of vector legitimacy
005 The second rule.
0051 MOVE 1 TO the second flag
0052 NOP.
006 The third rule: Evaluate the legitimacy of IF X<Y.
0061 Is the fourth area of L4, X is legitimate?
00611 If legitimate, GOTO 0062.
00612 If not legitimate, GOTO the fifth rule.
0062 Is the fourth area of L4, Y is legitimate?
00621 If legitimate, GOTO 0063.
00622 If not legitimate, GOTO the fifth rule.
0063 IF X<Y?
00631 If legitimate, GOTO the fourth rule.
00632 If not legitimate, GOTO the fifth rule.
007 The fourth rule.
0071 MOVE 0 TO the sixth flag of L3, D.
0072 MOVE 1 TO the fourth area of L3, D.
0073 ADD 1 TO the counter of the number of established subjects.
008 RETURN.
009 The fifth rule: Evaluate whether D of L3, D is established on the same Coordinate Period.
0091 MOVE 0 TO the sixth flag
0092 If (NS1=NS5), the processing advances to the seventh rule.
0093 If (NS1>NS5), the processing advances to the sixth rule.
010 the sixth rule: declare restart request for L3, D.
0101 Initialize the fourth area of L3, D.
0102 MOVE 1 TO the sixth flag.
0103 MOVE 0 TO the second flag.
0104 RETURN.
011 The seventh rule: declare stopping restart of L3, D.
0111 MOVE 1 TO the seventh flag.
0112 MOVE 0 TO the second flag.
0113 RETURN.

(Vector Model of L2, C)

The vector instructive statement example is "C=11". The instructive statement ruled by L2, C is placed in the second rule according to the vector description method. In L2, C there is no L3, C. If L3, C is present in L2, C, legitimacy evaluation of L3, C is added to the third rule. In this case, the fifth, sixth and seventh rules occur. Next, the program model in this case is shown.
001 START.
002 NOP.
003 CALL VWA(L2, C).
004 The first rule: Evaluate whether to advance to the second rule or RETURN using the legitimacy L2, C.
  see the section of vector legitimacy
005 The second rule.
0051 MOVE 1 TO the second flag
0052 C=11.
006 The third rule: Evaluate the legitimacy of C in C=H. NOP.
007 The fourth rule
0071 MOVE 0 TO the sixth flag of L2, C.
0072 MOVE C TO the fourth area of L2, C.
0073 ADD 1 TO the counter of the number of established subjects.
008 RETURN.
009 The fifth rule: NOP.
010 the sixth rule: NOP.
011 the seventh rule: NOP.

(Vector Model of W4, URIAGE)

The vector instructive statement example "WRITE URIAGE, DB11" is adopted. This is an instructive statement of writing URIAGE in an external memory area "DB11". The subject of the instructive statement is established in DB11. The legitimacy of DB11 is unknown. The role of the vector is to output legitimate L4, URIAGE to DB11. The instructive statement ruled by W4, URIAGE is placed in the fourth rule according to the vector description method. VWA of W4, URIAGE is replaced with L4, URIAGE and processed according to the first and third rules. It is assumed that in the W4, URIAGE there is no L3, URIAGE. If L3, URIAGE is present in W4, URIAGE, the legitimacy evaluation of L3, URIAGE is also added to the third rule. Next, the program model in this case is shown.
001 START.
002 NOP.
003 CALL VWA(W4, URIAGE).
004 The first rule: Evaluate whether to advance to the second rule or RETURN using the legitimacy L4, URIAGE.
 see the section of vector legitimacy
005 The second rule.
0051 MOVE 1 TO the second flag
0052 NOP.
006 The third rule: Evaluate the legitimacy of L4, URIAGE.
0061 Is the fourth area of L4, URIAGE is legitimate?
00611 If legitimate, GOTO the fourth rule.
00612 If not legitimate, GOTO the fifth rule.
007 The fourth rule.
0071 MOVE 0 TO the sixth flag of W4, URIAGE.
0072 WRITE URIAGE, DB11.
0073 ADD 1 TO the counter of the number of established subjects.
008 RETURN.
009 The fifth rule: Evaluate whether URIAGE of L4, URIAGE is established on the same Coordinate Period.
0091 MOVE 0 TO the sixth flag
0092 If (NS1=NS5), the processing advances to the seventh rule.
0093 If (NS1>NS5), the processing advances to the sixth rule.
010 The sixth rule: Declare restart request for W4, URIAGE.
0101 Initialize the fourth area of L4, URIAGE.
0102 MOVE 1 TO the sixth flag.
0103 MOVE 0 TO the second flag.
0104 RETURN.
011 The seventh rule: Declare stopping restart of W4, URIAGE.
0111 MOVE 1 TO the seventh flag.
0112 MOVE 0 TO the second flag.
0113 RETURN.

(Vector model of R2 DB11)

The vector instructive statement example is assumed as "READ DB11, aggregation". This is an instructive statement of moving the external memory area "DB11" to the aggregation. The subject of the instructive statement is established in the aggregation. The role of this vector is to establish legitimate aggregation. The instructive statement ruled by R2 DB11 is placed in the second rule according to the vector description method. VWA of R2 DB11 is replaced with L4, aggregation, and processed according to the first and third rules. It is assumed that in the R2 DB11 there is no L3, URIAGE. If L3, DB11 is present in R2 DB11, legitimacy evaluation of L3, DB11 is added to the third rule. Next, the program model in this case is shown.
001 START.
002 NOP.
003 CALL VWA(R2 DB11).
004 The first rule: Evaluate whether to advance to the second rule or RETURN using the legitimacy L4, aggregation.
 see the section of vector legitimacy
005 The second rule.
0051 MOVE 1 TO the second flag
0052 READ DB11, aggregation.
006 The third rule: Evaluate the legitimacy of L4, aggregation.
0061 Is the fourth area of L4, aggregation is legitimate?
00611 If legitimate, GOTO 007.
00612 If not legitimate, GOTO the fifth rule.
007 The fourth rule.
0071 MOVE 0 TO the sixth flag.
0072 MOVE the aggregation TO READ DB11, the fourth area of aggregation.
0073 ADD 1 TO the counter of the number of established subjects.
008 RETURN.
009 The fifth rule: Evaluate whether the aggregation of L4, aggregation is established on the same Coordinate Period.
0091 MOVE 0 TO the sixth flag
0092 If (NS1=NS5), the processing advances to the seventh rule.
0093 If (NS1>NS5), the processing advances to the sixth rule.
010 The sixth rule: READ DB11, declare a restart request for aggregation.
0101 READ DB11, initialize the fourth area of the aggregation.
0102 MOVE 1 TO the sixth flag.
0103 MOVE 0 TO the second flag.
0104 RETURN.
011 The seventh rule: READ DB11, declare stopping the restart of aggregation.
0111 MOVE 1 TO the seventh flag.
0112 MOVE 0 TO the second flag.
0113 RETURN.

(Logic Connection-Type Model of E41, P4 Program)

E41, P4 notifies that the present program is in an end state. To facilitate understanding of E41, P4, the description is made with the logic connection type. However, E41 has the intrinsic data area (fourth area). Consequently, programming is performed with the vector structure in actuality. Next, the program model in this case is shown.
001 START.
002 NS1 is adopted from the stack of the number of established subjects.
003 NS5 is adopted from the stack of the number of established subjects.
004 Evaluate whether (NS1)=(NS5).
0041 If YES, GO TO 005.
0041 If NO, GO TO 006.
005 MOVE 1 TO the fourth area of E41.
006 RETURN.

(Logic Connection-Type Model of E41, P4 Program)

E42, P4 notifies the symptom of logical inconsistency caused in the present program by means of the contamination of the instruction that does not reach the destruction of an instruction. To facilitate understanding of E42, P4, the description is made with the logic connection type. However, E42 has the intrinsic data area (fourth area). Consequently, programming is performed with the vector structure in actuality. Next, the program model in this case is shown.
001 START.
002 NS1 is adopted from the stack of the number of established subjects.

003 NS5 is adopted from the stack of the number of established subjects.
004 Evaluate whether (NS1)<(NS5): the logical inconsistency caused in the present program can be detected by this relationship.
0041 If YES, GO TO 005.
0041 If NO, GO TO 006.
005 MOVE 1 TO the fourth area of E42.
006 RETURN.

(Logic Connection-Type Model of T4, P4 Program)

T4, P4 notifies that the condition of switching the Coordinate Function-4 to the Coordinate Function-2 is satisfied, through the fourth area. To facilitate understanding of T4, P4, the description is made with the logic connection type. However, T4 has the intrinsic data area (fourth area). Accordingly, programming is performed with the vector structure in actuality. Next, the program model in this case is shown.
001 START.
002 Evaluate the criticality of P4.
0021 Create the sixth flag string of the Palette-4.
0022 Create the constants of the sixth flag string of the Palette-4.
003 Take XOR of the sixth flag string and the constants of the sixth flag string on the Palette-4.
0031 If XOR is ZERO, GOTO 004.
0032 If XOR is NOT ZERO, GOTO 005.
004 MOVE 1 TO the fourth area of T4.
005 RETURN.

(Logic Connection-Type Model of T2, P2 Program)

T2, P2 notifies that the condition of switching the Coordinate Function-2 to the Coordinate Function-3 is satisfied, through the fourth area. To facilitate understanding of T2, P2, the description is made with the logic connection type. However, T2 has the intrinsic data area (fourth area). Accordingly, programming is performed with the vector structure in actuality. Next, the program model in this case is shown.
001 START.
002 Evaluate the criticality of P2.
0021 Create the sixth flag string of the Palette-2.
0022 Create the constants of the sixth flag string of the Palette-2.
003 Take XOR of the sixth flag string and the constants of the sixth flag string on the Palette-2.
0031 If XOR is ZERO, GOTO 004.
0032 If XOR is NOT ZERO, GOTO 005.
004 MOVE 1 TO the fourth area of T4.
005 RETURN.

(Logic Connection-Type Model of T31, P3 Program)

The "fourth area of T31" notifies that the condition of switching the Coordinate Function-3 to the own Coordinate Function-4 is satisfied. To facilitate understanding of T31, P3, the description is made with the logic connection type. However, T31 has the intrinsic data area (fourth area). Accordingly, programming is performed with the vector structure in actuality. The initial value of the fourth area of T31 is on. Next, the program model in this case is shown.
001 START.
002 Evaluate the criticality of P3.
0021 Create the sixth flag string of the Palette-3.
0022 Create the constants of the sixth flag string of the Palette-3.
003 Take XOR of the sixth flag string and the constants of the sixth flag string on the Palette-3 (first condition).
0031 If XOR is ZERO, GOTO 004.
0032 If XOR is NOT ZERO, GOTO 006.
004 Evaluation through use of the subject distribution table (FIG. 13).
0041 Are all the subjects of the present program in the present program (second condition).
0042 If YES, GO TO 005.
0043 If NO, GO TO 006.
005 MOVE 1 TO the fourth area of T31.
006 RETURN.

(Logic Connection-Type Model of T32, P3 Program)

The "fourth area of T32" notifies that the condition of switching the Coordinate Function-3 to the Coordinate Function-4 of the present program (2, 1) lower in the rank structure than the present program (1, 1) is satisfied. To facilitate understanding of T32, P3, the description is made with the logic connection type. However, T32 has the intrinsic data area (fourth area). Accordingly, programming is performed with the vector structure in actuality. Next, the program model in this case is shown.
001 START.
002 Evaluate the criticality of P3.
0021 Create the sixth flag string of the Palette-3.
0022 Create the constants of the sixth flag string of the Palette-3.
003 Take XOR of the sixth flag string and the constants of the sixth flag string on the Palette-3 (first condition).
0031 If XOR is ZERO, GOTO 004.
0032 If XOR is NOT ZERO, GOTO 006.
004 Evaluation through use of the subject distribution table (FIG. 13).
0041 Is the subject of the present program in the immediately lower present program (second condition).
0042 If YES, GO TO 005.
0043 If NO, GO TO 006.
005 MOVE 1 TO the fourth area of T32.
006 RETURN.

(Logic connection-type model of T33, P3 program)

The "fourth area of T33" notifies that the condition of switching the Coordinate Function-3 to the Coordinate Function-3 of the highest present program in the rank structure with respect to the present program (1, 1) is satisfied. To facilitate understanding of T33, P3, the description is made with the logic connection type. However, T33 has the intrinsic data area (fourth area). Accordingly, programming is performed with the vector structure in actuality. Next, the program model in this case is shown.
001 START.
002 Evaluate the criticality of P3.
0021 Create the sixth flag string of the Palette-3.
0022 Create the constants of the sixth flag string of the Palette-3.
003 Take XOR of the sixth flag string and the constants of the sixth flag string on the Palette-3 (first condition).
0031 If XOR is ZERO, GOTO 004.
0032 If XOR is NOT ZERO, GOTO 006.
004 Evaluation through use of the subject distribution table (FIG. 13).
0041 Is the subject of the present program in the immediately upper present program (second condition).
0042 If YES, GO TO 005.
0043 If NO, GO TO 006.
005 MOVE 1 TO the fourth area of T32.
006 RETURN.

(Description of "Subject Distribution Table" FIG. 13)

This diagram is for representing to which program the subject belongs among the present programs belonging to the rank structure. For example, (1, 1) is the position coordinates of the Scenario Function in the rank structure.

(Program Logic Connection-Type Model of Coordinate Function-4)

The program model of the Coordinate Function-4 is described below.

001 START.
002 Designate the vector with the installation order 1 (i=1) on the Palette-4: start of the Coordinate Period-4.
003 Start the vector having the installation order (i).
004 Here is the RETURN point of the started vector.
005 Evaluate presence or absence of the instruction destroying signal (OS).
0051 In the case of presence, start SEP: Stop execution of the present program.
0052 In the case of absence, GO TO 006.
006 Designate the next vector to be started (i=i+1).
007 Does (i) exceed the number of installed vectors (N4) on the Palette-4.
0071 In the exceeded case, GO TO 008.
0072 In the not exceeded case, GO TO 003.
008 Determine the achievement of the criticality of the Palette-4: use of turning ON and OFF the fourth area of T4
0081 If OFF, GO TO 002.
0082 If ON, GO TO 009: End of Coordinate Period-4
009 Evaluate presence or absence of logical inconsistency occurrence: use of turning ON and OFF the fourth area of E42.
0091 If ON, start SLP: Stop execution of the present program.
0092 If OFF, GO TO 010: no logical inconsistency occurs in the present program
010 Perform the following process to return to the Synchronization Function.
0101 Initialize all the vectors with the seventh flag being on, on the Palette-4.
0102 Start a stack update program.
011 RETURN to the Synchronization Function.

(Program Logic Connection-Type Model of Coordinate Function-2)

The program model of the Coordinate Function-2 is described below.

001 START.
002 Designate the vector with the installation order 1 (i=1) on the Palette-2: start of the Coordinate Period-2.
003 Start the vector having the installation order (i).
004 Here is the RETURN point of the started vector.
005 Evaluate presence or absence of the instruction destroying signal (OS).
0051 In the case of presence, start SEP: Stop execution of the present program.
0052 In the case of absence, GO TO 006.
006 Designate the next vector to be started (i=i+1).
007 Does (i) exceed the number of installed vectors (N2) on the Palette-2?
0071 In the exceeded case, GO TO 008.
0072 In the not exceeded case, GO TO 003.
008 Evaluate the achievement of the criticality of the Palette-2: use of turning ON and OFF the fourth area of T2
0081 If OFF, GO TO 002.
0082 If ON, GO TO 009: End of Coordinate Period-2
009 Evaluate presence or absence of logical inconsistency occurrence: use of turning ON and OFF the fourth area of E42.
0091 If ON, start SLP: Stop execution of the present program.
0092 If OFF, GO TO 010: no logical inconsistency occurs in the present program
010 Perform the following process to return to the Synchronization Function.
0101 Initialize all the vectors with the seventh flag being on, on the Palette-2.
011 RETURN to the Synchronization Function.

(Program Logic Connection-Type Model of Coordinate Function-3)

The program model of the Coordinate Function-3 is described below.

001 START.
002 Designate the vector with the installation order 1 (i=1) on the Palette-3: start of the Coordinate Period-3.
003 Start the vector having the installation order (i).
004 Here is the RETURN point of the started vector.
005 Evaluate presence or absence of the instruction destroying signal (OS).
0051 In the case of presence, start SEP: Stop execution of the present program.
0052 In the case of absence, GO TO 006.
006 Designate the next vector to be started (i=i+1).
007 Does (i) exceed the number of installed vectors (N3) on the Palette-2.
0071 In the exceeded case, GO TO 008.
0072 In the not exceeded case, GO TO 003.
008 Evaluate the achievement of the criticality of the Palette-3: use of turning ON and OFF the fourth area of T2
0081 If OFF, GO TO 002.
0082 If ON, GO TO 009: End of Coordinate Period-5
009 Evaluate presence or absence of logical inconsistency occurrence: use of turning ON and OFF the fourth area of E42.
0091 If ON, start SLP: Stop execution of the present program.
0092 If OFF, GO TO 010: no logical inconsistency occurs in the present program
010 Perform the following process to return to the Synchronization Function.
0101 Initialize all the vectors with the seventh flag being on, on the Palette-3.
011 RETURN to the Synchronization Function.

(Program Logic Connection-Type Model of Synchronization Function)

001 START.
002 Start a stack initializing program.
003 Finish evaluation of the present program: use of turning ON and OFF of the fourth area of E41
0031 If ON, GO TO 004: a finish process of the present program
0032 If OFF, GO TO 005: start the present program
004 Start SEP: System Ending Program (program of finishing the present program)
005 Evaluate whether ON or OFF in the fourth area of T31: start the own Coordinate Function-4
0051 If ON, turn OFF the fourth area of T31.
0052 Start the own Coordinate Function-4
0053 If OFF, GO TO 006.
006 Evaluate whether ON or OFF in the fourth area of T32: start the nearest lower Coordinate Function-4
0061 If ON, turn ON the fourth area of T32.
0062 Start the nearest lower Coordinate Function-4.
0063 If OFF, GO TO 007: If the nearest lower Coordinate Function-4 is absent, turn OFF.
007 Evaluate whether ON or OFF in the fourth area of T33: start the highest Coordinate Function-3
0071 If ON, turn OFF the fourth area of T33.
0072 Start the highest Coordinate Function-3

0073 If OFF, GO TO 008: If the highest Coordinate Function-3 is absent, turn OFF.
008 Evaluate whether ON or OFF in the fourth area of T4: start the own Coordinate Function-2
0081 If ON, turn OFF the fourth area of T4.
0082 Start the own Coordinate Function-2
0083 If OFF, GO TO 009: start the own Coordinate Function-3.
009 Evaluate whether ON or OFF in the fourth area of T2: start the own Coordinate Function-3
0091 If ON, turn OFF the fourth area of T2.
0092 Start the own Coordinate Function-3
0093 If OFF, GO TO 010.
010 Evaluate whether ON or OFF in the fourth area of T32: start the Coordinate Function-4 immediately therebelow
0101 If ON, turn OFF the fourth area of T32.
0102 Start the own Coordinate Function-4 immediately therebelow
0103 If OFF, GO TO 011.
011 Evaluate whether ON or OFF in the fourth area of T33: start the highest Coordinate Function-3
0111 If ON, turn OFF the fourth area of T33.
0112 Start the highest Coordinate Function-3
0103 If OFF, GO TO 052.
012 END.

(Vector Model of E41, P4 Program)

Two examples of the logic connection-type models of the Control Vectors are replaced with vectors. The same replacement method is applicable to the other Control Vectors. The prototype of converting the Control Vector of the logic connection-type model into the vector model is L4, A. The instructive statement of the vector adopts a stack. The instructive statement adopting the stack is placed in the second rule. E41, P4 does not have L3. Next, the program model is shown.
001 START.
002 NOP.
003 CALL VWA(E41, P4).
004 The first rule: Evaluate whether to advance to the second rule or RETURN using the legitimacy E41, P4.
    see the section of vector legitimacy
005 The second rule.
0051 MOVE 1 TO the second flag
0052 NS1 is adopted from the stack of the number of established subjects.
0053 NS5 is adopted from the stack of the number of established subjects.
006 The third rule: Evaluate whether (NS1)=(NS5).
0061 If YES, GO TO the fourth rule.
0062 If NO, GO TO the fifth rule.
007 The fourth rule.
0071 MOVE 0 TO the sixth flag of E41, P4.
0072 MOVE A TO the fourth area of E41, P4.
0073 ADD 1 TO the counter of the number of established subjects.
008 RETURN.
009 The fifth rule: Determine whether E41, P4 is established on the same Coordinate Period.
0091 MOVE 0 TO the sixth flag
0092 If (NS1=NS5), GO TO the seventh rule.
0093 If (NS1>NS5), GO TO the sixth rule.
010 the sixth rule: declare restart request for E41, P4.
0101 Initialize the fourth area of E41, P4.
0102 MOVE 0 TO the sixth flag.
0103 MOVE 0 TO the second flag.
0104 RETURN.
011 The seventh rule: declare stopping restart of E41, P4.
0111 MOVE 1 TO the seventh flag.
0112 MOVE 0 TO the second flag.
0113 RETURN.

(Vector Model of T33, P3 Program)

The instructive statement of the vector adopts a stack. The instructive statement adopting the stack is placed in the second rule. T33, P3 does not have L3. Next, the program model is shown.
001 START.
002 NOP.
003 CALL VWA(T33, P3).
004 The first rule: Evaluate whether to advance to the second rule or RETURN using the legitimacy T33, P3.
    see the section of vector legitimacy
005 The second rule: Prepare evaluation of achievement of T33, P3:
0051 MOVE 1 TO the second flag
0052 Create the sixth flag string of the Palette-3.
0053 Create the constants of the sixth flag string of the Palette-3.
006 The third rule: Determine the achievement of T33 and P3.
061 Determine the criticality of P3.
00611 Take XOR of the sixth flag string and the constants of the sixth flag string on the Palette-3 (first condition).
00612 If XOR is ZERO, GOTO 0062.
00613 If XOR is NOT ZERO, GOTO the fifth rule.
0062 Determination through use of the subject distribution table (FIG. 13).
00621 Is the subject of the present program in the immediately upper program (second condition).
00622 If YES, GO TO the fourth rule.
00623 If NO, GO TO RETURN.
007 The fourth rule.
0071 MOVE 0 TO the sixth flag of T33, P3.
0072 MOVE A TO the fourth area of T33, P3.
0073 ADD 1 TO the counter of the number of established subjects.
008 RETURN.
009 The fifth rule: Determine whether P3 is established on the same Coordinate Period.
0091 MOVE 0 TO the sixth flag
0092 If (NS1>NS5), GO TO the sixth rule.
0093 If not (NS1>NS5), GO TO the seventh rule.
010 the sixth rule: declare restart request for E41, P4.
0101 Initialize the fourth area of T33, P3.
0102 MOVE 1 TO the sixth flag.
0103 MOVE 0 TO the second flag.
0104 RETURN.
011 The seventh rule: declare stopping restart of T33, P3.
0111 MOVE 1 TO the seventh flag.
0112 MOVE 0 TO the second flag.
0113 RETURN.

(Program Logic Connection-Type Model of Stack Update Program)
001 START.
002 If the counter of the number of established subjects is zero, initialize the stack: start the stack initializing program.
003 RETURN.
004 If the counter of the number of established subjects is not zero and NS1, 2, 3 and 4 are zero,
005 Overwrite NS1 with the counter of the number of established subjects
006 RETURN.
007 If the counter of the number of established subjects is not zero and NS1, 2, 3 and 4 are zero,
008 Overwrite NS2 with NS1.

009 Overwrite NS1 with the counter of the number of established subjects
010 RETURN.
011 If the counter of the number of established subjects is not zero and NS 3 and 4 are zero,
012 Overwrite NS2 with NS1.
013 Overwrite NS3 with NS2.
014 Overwrite NS1 with the counter of the number of established subjects
015 RETURN.
016 If the counter of the number of established subjects is not zero and NS 4 is zero,
017 Overwrite NS2 with NS1.
018 Overwrite NS3 with NS2.
019 Overwrite NS4 with NS3.
020 Overwrite NS1 with the counter of the number of established subjects
021 RETURN.
022 If the counter of the number of established subjects is not zero and all NS are not zero,
023 Overwrite NS2 with NS1.
024 Overwrite NS3 with NS2.
025 Overwrite NS4 with NS3.
026 Overwrite NS5 with NS4.
027 Overwrite NS1 with the counter of the number of established subjects
028 RETURN.

(Program Logic Connection-Type Model of Stack Initializing Program)

Start (CALL) the present program at the start point of the synchronization period for the fifth rule (NS1>NS5) of the Subject Vector using this stack information, and the Control Vectors E41 (NS1=NS5) and E42 (NS1<NS5). Next, the program model is shown.
001 START.
002 Set one in NS5.
003 Zero-clear NS4.
004 Zero-clear NS3.
005 Zero-clear NS2.
006 Zero-clear NS1.
007 Zero-clear the counter of the number of established subjects.
008 RETURN.

Even if a virus invades a program in operation according to the present invention (hereinafter "the present program"), regardless of the timing and means of invasion and the number of attempts thereof, the present program autonomously detects the virus as contamination of a memory area used by the program and disinfects the contamination for quick recovery in order to continue the normal operation of the present program.

The present program detects the virus as contamination caused by false information against the intent of the present program. Upon occurrence of contamination, the present program detects the contamination as a predicate inconsistency. The present program is provided with the scheme. However, this scheme is not for detecting an invading virus but is needed as a structural requirement in order for the program to exist as a legitimate program. The present program disinfects the detected contamination using a scheme in accordance with the present invention. This disinfecting scheme is obtained also as the structural requirement for allowing the program to be present as a legitimate program. Timing for detecting contamination and timing for disinfecting the contamination are timing according to the present invention. The timing of disinfection prevents the viral symptom from occurring, in view of which this exerts the same operational effect as that of destroying the viral intent. This is an advantageous effect that is intrinsic to the present application and is exerted only by the present application.

As described above in detail, the present invention provides an intrinsic solution to virus problems. That is, the present program does not solve viruses as the virus problems. The present program has the scheme of making the virus problems (viral invasion problems and viral symptom problems) absent even with presence of viruses, that is, the scheme of solution.

Figure 14:
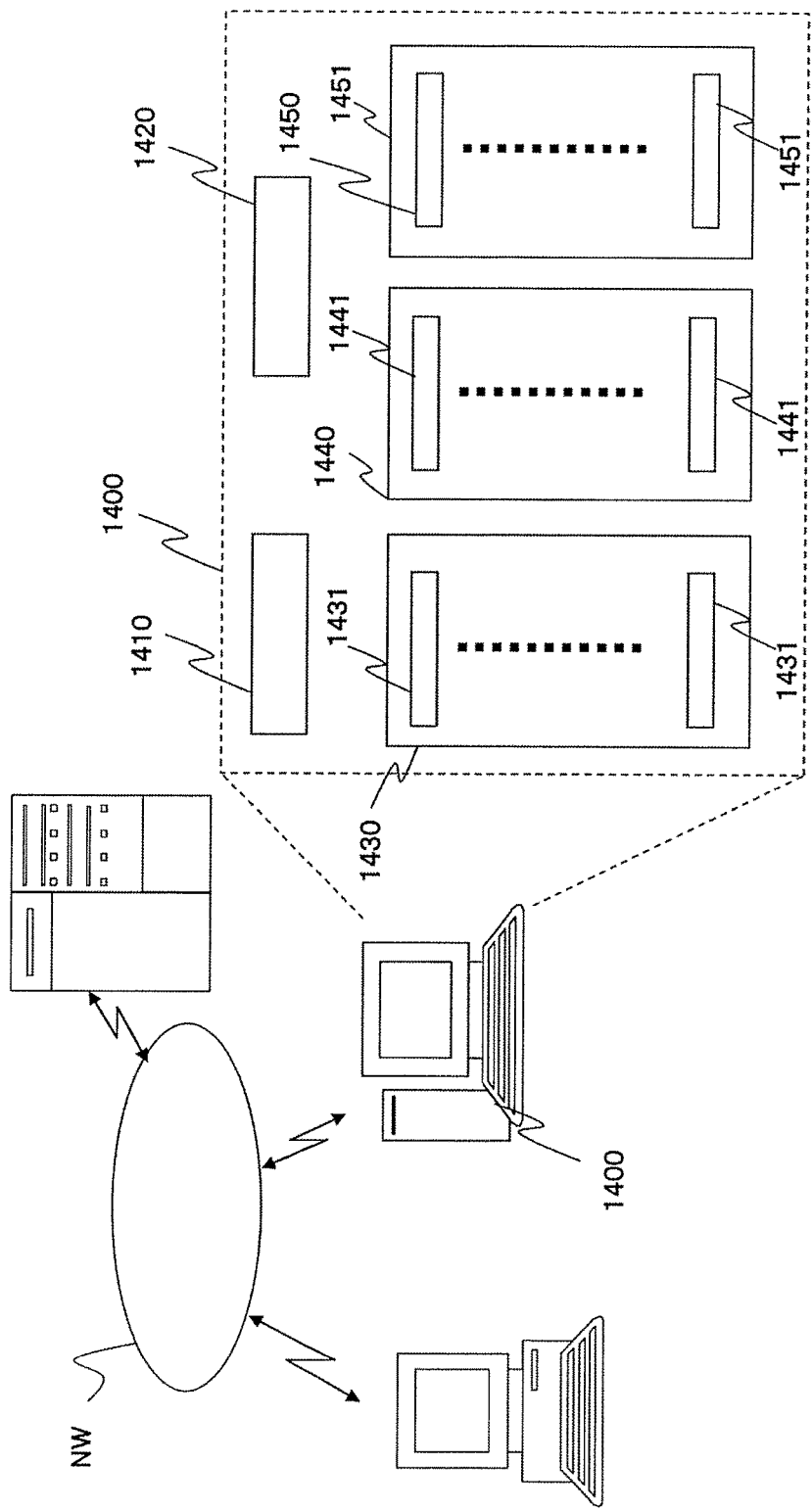
FIG. 14 is an overall structure diagram showing a mode allowing the present program to be mounted according to one embodiment of the present invention.

The technical thought according to the present application is not limited to the above embodiments, but can be variously modified, replaced, adoption of an alternative, improved, enlarged, and reduced within the scope of this thought instead. The technical thought according to the present application is also applicable to a program, a functional chip, and a secondary combined product mounted with the device according to the present invention. Furthermore, the present invention can be implemented as: the definition structure of a program that is the structure intrinsic to the present invention, autonomously solves the virus problems and has been described above in detail; the storage medium equipped with the program; the method of disabling the virus problems; and the device for autonomously solving virus problem (equipped as a component that serves functions equivalent to that of these programs, for example). That is, FIG. 14 is the overall structure diagram showing one mode that can be equipped with the present program according to one embodiment of the present invention. As shown here, the present application can be achieved as and applied to: a system 1400 equipped with, as the overall structure program, all of a routine 1431 having a vector L4 structure according to the present application, a routine 1441 having a vector L2 structure, a routine 1451 having a vector L3 structure, a routine 1430 having an L4 Palette structure in which a routine 1431 is accumulated according to the present application, a routine 1440 having an L2 Palette structure in which a routine 1441 is accumulated according to the present application, and a routine 1450 having an L3 Palette structure in which a routine 1451 is accumulated according to the present application (description on other vectors R2, W4 and the like are omitted but it is a matter of course that these vectors are included); a mode that provides these item as individual programs in an ASP (application service provider) form; a mode that provides these functions in separate components as devices; a mode that provides the programs in separate programs; and a mode that provides these items as a storage medium installed with the programs. The core part of this technical thought described above is applicable to any of these mechanisms.

INDUSTRIAL APPLICABILITY

The computer programs have already been widespread over all the fields of the human beings. Consequently, as with fields in which programs have already been threatened, the programs in all the fields will be incessantly threatened by the virus problems without exception. The present invention contributes to the human beings in terms of solving the virus problems once for all. The present invention cannot be found and replaced. In this view, the present invention has a possibility of huge usability not only in the computer industry but also in various industries including automobile, aircraft, nuclear energy, and household electrical appliance industries.

REFERENCE SIGNS LIST 1A-1 . . . Memory area of computer, 1A-10 . . . Conventional program, 1A-11 . . . Program of present invention, 10-1 . . . Memory area of computer, 1C-10 . . . Conventional program, 1C-11 . . . Program of present invention, and 1C-2 . . . Computer virus

The invention claimed is:

1. A definition structure of a program coupled to a non-transitory computer readable medium comprising executable instructions to execute the structure to enable the program to establish:
   a contamination detection mechanism for unassistedly detecting contamination in case a predetermined memory area for a program in an execution state is contaminated with anti-intent information against intent on the program because of any reason;
   a decontamination mechanism for unassistedly disinfecting the contamination detected by the contamination detection mechanism; and
   a normal state recovery mechanism for causing the memory area to recover a normal state automatically; and
   wherein the program comprises:
   a first function that has a structure cycling until a critical state of a Palette-4 where vector structures are accumulated in any order is achieved, the vector structure being a minimum predicate structure for determining content for a data area serving as a subject;
   a second Function that has a structure cycling until a critical state of a Palette-2 where vector structures are accumulated in any order is achieved, the vector structure being a minimum predicate structure for determining content for a data area serving as a subject;
   a third Function that has a structure cycling until a critical state of a Palette-3 where vector structures are accumulated in any order is achieved, the vector structure being a minimum predicate structure for determining content for a data area serving as a subject;
   a fourth Function that causes control to transition to the Palette-2 when the Palette-4 comes into the critical state, transition to the Palette-3 when the Palette-2 comes into the critical state, and transition to any of the third Function pertaining to a highest rank, the first Function pertaining to an identical rank, and the first Function pertaining to a layer lower by one layer according to presence of a fourth area of a variable subject for establishing the subject when the Palette-3 comes into the critical state, wherein the functions are all basic programs of the program stored on a non-transitory computer readable medium and the vector includes a plurality of rules and the Palettes are three types of subset of vectors.

2. The definition structure of a program according to claim 1, wherein the contamination detection mechanism has a structure of a vector that includes seven rules.

3. The definition structure of a program according to claim 2, further comprising a fourth area genealogy legitimacy evaluating mechanism for evaluating legitimacy of genealogy of the fourth area in order to evaluate the legitimacy of the fourth area by the third rule of the vector.

4. The definition structure of a program according to claim 2, further comprising a fourth area genealogy achievement prediction mechanism that performs future prediction of achievement of genealogy of the fourth area using a stack of the number of achievements in the fourth area according to the fifth rule pertaining to the vector.

5. The definition structure of a program according to claim 1, wherein the decontamination mechanism includes an initialization mechanism for initializing the vector.

6. The definition structure of a program according to claim 5, wherein the decontamination mechanism initializes the vector at timing before appearance of a symptom intended and caused by the anti-intent information with which the contamination is ascertained.

7. The definition structure of a program according to claim 5 or 6, wherein the vector has a structure that adds optimal timing to the contamination detection mechanism and/or the decontamination mechanism.

8. The definition structure of a program according to any one of claims 1 to 7, wherein the normal state recovery mechanism has a restart mechanism that is established in the program.

9. The definition structure of a program according to any one of claims 1 to 8,
   wherein the vector pertaining to the contamination detection mechanism includes at least a second flag that indicates passage through the second rule, a sixth flag for requesting restart of the vector itself, a seventh flag for declaring a temporary stop of the restart of the vector itself, and a fourth area that is an area evaluated by the third rule and determined by the fourth rule, and
   the contamination detection mechanism includes a three-type flags and fourth area relative relationship evaluating mechanism that evaluates relative relationship between the second, sixth and seventh flags and the fourth area.

10. The definition structure of a program according to any one of claims 1 to 4, further comprising an instruction contamination detection mechanism that detects instruction contamination that cannot be detected by an OS pertaining to the program.

11. A definition structure of an autonomous virus solution program, coupled to an non-transitory computer readable medium, for solving, as a program structure, a problem which a virus invading an operation program started on an OS (operating system) or a data area included in the operation program can cause, comprising:
   a Coordinate Function-4 that has a structure cycling until a critical state of a Palette-4 where vector structures are accumulated in any order is achieved, the vector structure being a minimum predicate structure for determining content for a data area serving as a subject;
   a Coordinate Function-2 that has a structure cycling until a critical state of a Palette-2 where vector structures are accumulated in any order is achieved, the vector structure being a minimum predicate structure for determining content for a data area serving as a subject;
   a Coordinate Function-3 that has a structure cycling until a critical state of a Palette-3 where vector structures are accumulated in any order is achieved, the vector structure being a minimum predicate structure for determining content for a data area serving as a subject;
   a Synchronization Function that causes control to transition to the Palette-2 when the Palette-4 comes into the critical state, transition to the Palette-3 when the Palette-2 comes into the critical state, and transition to any of the Coordinate Function-3 pertaining to a highest rank, the Coordinate Function-4 pertaining to an identical rank, and the Coordinate Function-4 pertaining to a layer lower by one layer according to presence of a fourth area of a variable subject for establishing the subject when the Palette-3 comes into the critical state, wherein the Coordinate Function-2, Coordinate Function-3, Coordinate Function 4 and Synchronization Function are all basic programs of the program stored on the non-transitory computer readable medium and the Palettes are three types of subset of vectors; and
wherein the vector includes: a contamination detection mechanism for unassistedly detecting contamination in case the data area is contaminated because of any reason;
a decontamination mechanism for unassistedly disinfecting the contamination detected by the contamination detection mechanism; and
a normal state recovery mechanism for causing the memory area to recover a normal state automatically, wherein the vector has a plurality of rules.

12. The definition structure of a program according to claim 11, wherein the vector includes:
a contamination detection mechanism for unassistedly detecting contamination in case the data area is contaminated because of any reason;
a decontamination mechanism for unassistedly disinfecting the contamination detected by the contamination detection mechanism; and
a normal state recovery mechanism for causing the memory area to recover a normal state automatically.

13. The definition structure of a program according to claim 11, wherein the vector has seven rules.

14. The definition structure of a program according to claim 13, further comprising a fourth area genealogy legitimacy evaluating mechanism for evaluating legitimacy of genealogy of the fourth area in order to evaluate the legitimacy of the fourth area by the third rule of the vector.

15. The definition structure of a program according to claim 13, further comprising a fourth area genealogy achievement prediction mechanism that performs future prediction of achievement of genealogy of the fourth area using a stack of the number of achievements in the fourth area according to the fifth rule pertaining to the vector.

16. The definition structure of a program according to claim 12 or 13, wherein the decontamination mechanism includes an initialization mechanism for initializing the vector.

17. The definition structure of a program according to claim 16, wherein the decontamination mechanism initializes the vector at timing before appearance of a symptom intended and caused by the anti-intent information with which the contamination is ascertained.

18. The definition structure of a program according to any one of claims 12 to 17, wherein the vector has a structure that adds optimal timing to the contamination detection mechanism and/or the decontamination mechanism.

19. The definition structure of a program according to any one of claims 12 to 18, wherein the normal state recovery mechanism has a restart mechanism that is established in the program.

20. The definition structure of a program according to any one of claims 12 to 19,
wherein the vector pertaining to the contamination detection mechanism includes at least a second flag that indicates passage through the second rule, a sixth flag for requesting restart of the vector itself, a seventh flag for declaring a temporary stop of the restart of the vector itself, and a fourth area that is an area evaluated by the third rule and determined by the fourth rule, and the contamination detection mechanism includes a three-type flags and fourth area relative relationship evaluating mechanism that evaluates relative relationship between the second, sixth and seventh flags and the fourth area.

21. The definition structure of a program according to any one of claims 11 to 15, further comprising an instruction contamination detection mechanism that detects instruction contamination that cannot be detected by an OS pertaining to the program.

22. The definition structure of a program according to any one of claims 11 to 15, further comprising a Palette critical state ascertaining mechanism for ascertaining the critical state of the Palette used to switch the Coordinate Function.

23. A non-transitory storage medium storing the definition structure of a program according to claim 1.

24. An autonomous virus solution device causing the definition structure of a program according to any one of claims 1 to 22 to function as a component of the device.

25. An autonomous virus solution method, comprising:
unassistedly detecting contamination in case a predetermined memory area for a program in an execution state is contaminated with anti-intent information against intent on the program because of any reason;
unassistedly disinfecting the detected contamination; and
causing the memory area to recover a normal state automatically; and
wherein the program comprises:
a first function that has a structure cycling until a critical state of a Palette-4 where vector structures are accumulated in any order is achieved, the vector structure being a minimum predicate structure for determining content for a data area serving as a subject;
a second Function that has a structure cycling until a critical state of a Palette-2 where vector structures are accumulated in any order is achieved, the vector structure being a minimum predicate structure for determining content for a data area serving as a subject;
a third Function that has a structure cycling until a critical state of a Palette-3 where vector structures are accumulated in any order is achieved, the vector structure being a minimum predicate structure for determining content for a data area serving as a subject;
a fourth Function that causes control to transition to the Palette-2 when the Palette-4 comes into the critical state, transition to the Palette-3 when the Palette-2 comes into the critical state, and transition to any of the third Function pertaining to a highest rank, the first Function pertaining to an identical rank, and the first Function pertaining to a layer lower by one layer according to presence of a fourth area of a variable subject for establishing the subject when the Palette-3 comes into the critical state, wherein the functions are all basic programs of the program stored on a non-transitory computer readable medium and the vector includes a plurality of rules and the Palettes are three types of subset of vectors.

26. The autonomous virus solution method according to claim 25, wherein the contamination is ascertained by having a structure of a vector having seven rules.

27. The autonomous virus solution method according to claim 26, further performing future prediction of achievement of genealogy of the fourth area using a stack of the number of achievements in the fourth area according to the fifth rule pertaining to the vector.

28. The autonomous virus solution method according to claim 26, further evaluating legitimacy of genealogy of the fourth area in order to evaluate the legitimacy of the fourth area by the third rule of the vector.

29. The autonomous virus solution method according to claim 26, wherein the disinfecting is performed by an initialization mechanism for initializing the vector.

30. The autonomous virus solution method according to claim 29, wherein the disinfecting initializes the vector at timing before appearance of a symptom intended and caused by the information with which the contamination is ascertained.

31. The autonomous virus solution method according to claim 29 or 30, wherein the vector has a structure that adds optimal timing to the contamination and/or the disinfecting.

32. The autonomous virus solution method according to any one of claims 25 to 31, wherein the recovering automatically to the normal state is performed by a restart mechanism that is established in the program.

33. The autonomous virus solution method according to any one of claims 25 to 32,
wherein the vector includes at least a second flag that indicates passage through the second rule, a sixth flag for requesting restart of the vector itself, a seventh flag for declaring a temporary stop of the restart of the vector itself, and a fourth area that is an area evaluated by the third rule and determined by the fourth rule, and
the contamination is ascertained by evaluating relative relationship between the second, sixth and seventh flags and the fourth area.

34. The autonomous virus solution method according to any one of claims 26 to 27, further detecting instruction contamination that cannot be detected by OS pertaining to the program.

* * * * *